United States Patent
Nakagawa

(10) Patent No.: US 7,468,769 B2
(45) Date of Patent: Dec. 23, 2008

(54) RETARDATION COMPENSATOR AND SINGLE-PANEL TYPE COLOR LIQUID CRYSTAL PROJECTOR

(75) Inventor: Kenichi Nakagawa, Shizuoka (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 108 days.

(21) Appl. No.: 10/745,999

(22) Filed: Dec. 29, 2003

(65) Prior Publication Data

US 2004/0141122 A1 Jul. 22, 2004

(30) Foreign Application Priority Data

Dec. 27, 2002 (JP) ............... 2002-379433

(51) Int. Cl.
*G02F 1/1335* (2006.01)
(52) U.S. Cl. .......................... 349/117; 349/5
(58) Field of Classification Search ......... 349/117–119, 349/5–10
See application file for complete search history.

(56) References Cited

U.S. PATENT DOCUMENTS

| | | | |
|---|---|---|---|
| 5,161,042 A | | 11/1992 | Hamada |
| 5,196,953 A | * | 3/1993 | Yeh et al. ............. 349/119 |
| 5,638,197 A | | 6/1997 | Gunning, III et al. |
| 6,169,589 B1 | * | 1/2001 | Kaneko ............. 349/117 |
| 6,590,707 B1 | * | 7/2003 | Weber ............. 359/498 |
| 7,170,574 B2 | * | 1/2007 | Tan et al. ............. 349/117 |
| 2002/0018162 A1 | | 2/2002 | Suzuki et al. |

FOREIGN PATENT DOCUMENTS

| | | |
|---|---|---|
| JP | 2002-31782 | 1/2002 |
| JP | 2002-131750 | 5/2002 |

OTHER PUBLICATIONS

J. P. Eblen, Jr., "17.4: Birefringent Compensators for Normally White TN-LCDs," Symposium Digest, Society for Information Display, 1994, pp. 245-248.

* cited by examiner

*Primary Examiner*—Dung T. Nguyen
(74) *Attorney, Agent, or Firm*—Buchanan Ingersoll & Rooney PC

(57) ABSTRACT

A form birefringence to compensate the phase retardation caused by a liquid crystal device has a retardation compensation film that is composed of alternately deposited high and low refractive index layers. The retardation compensation film is provided in at least one of the incident side and the emanation side of the liquid crystal device. The birefringence value Δn and the total thickness d of the retardation compensation film are adjusted such that the retardation of the retardation compensation film agrees with the retardation of the liquid crystal device at least at one wavelength in the visible band.

8 Claims, 21 Drawing Sheets

FIG. 7

[ TN LIQUID CRYSTAL DEVICE ]

| λ (nm) | Δn | d·Δn (d=4.5μm) | Re (0.7×d·Δn) |
|---|---|---|---|
| 400 | 0.1360 | 0.612 | 0.428 |
| 450 | 0.1310 | 0.590 | 0.413 |
| 500 | 0.1270 | 0.572 | 0.400 |
| 550 | 0.1240 | 0.558 | 0.391 |
| 600 | 0.1210 | 0.545 | 0.381 |
| 650 | 0.1190 | 0.536 | 0.375 |
| 700 | 0.1180 | 0.531 | 0.372 |

FIG. 8

[ RETARDATION COMPENSATION FILM (1): d=2μm ]

| λ (nm) | REFRACTIVE INDEX | | $N_{TE}$ | $N_{TM}$ | Δn k=0.55 | d·Δn (μm) |
| | $TiO_2$ LAYER | $SiO_2$ LAYER | | | | |
|---|---|---|---|---|---|---|
| 400 | 2.5530 | 1.480 | 2.138 | 1.858 | 0.280 | 0.561 |
| 450 | 2.4492 | 1.476 | 2.069 | 1.831 | 0.238 | 0.476 |
| 500 | 2.3783 | 1.472 | 2.021 | 1.811 | 0.210 | 0.420 |
| 550 | 2.3404 | 1.470 | 1.996 | 1.800 | 0.196 | 0.393 |
| 600 | 2.3095 | 1.468 | 1.976 | 1.791 | 0.185 | 0.370 |
| 650 | 2.2885 | 1.467 | 1.962 | 1.784 | 0.178 | 0.356 |
| 700 | 2.2735 | 1.465 | 1.952 | 1.779 | 0.173 | 0.345 |

[ RETARDATION COMPENSATION FILM (2): d=2.55μm ]

| λ (nm) | REFRACTIVE INDEX | | $N_{TE}$ | $N_{TM}$ | Δn k=0.55 | d·Δn (μm) |
|---|---|---|---|---|---|---|
| | LiNbO₃ LAYER | SiO₂ LAYER | | | | |
| 400 | 2.3305 | 1.480 | 1.993 | 1.806 | 0.187 | 0.478 |
| 450 | 2.2834 | 1.476 | 1.961 | 1.790 | 0.172 | 0.438 |
| 500 | 2.2457 | 1.472 | 1.936 | 1.777 | 0.159 | 0.406 |
| 550 | 2.2237 | 1.470 | 1.921 | 1.769 | 0.152 | 0.388 |
| 600 | 2.2082 | 1.468 | 1.911 | 1.763 | 0.148 | 0.376 |
| 650 | 2.1990 | 1.467 | 1.905 | 1.760 | 0.145 | 0.370 |
| 700 | 2.1874 | 1.465 | 1.897 | 1.755 | 0.141 | 0.361 |

[ RETARDATION COMPENSATION FILM (3): d=2.0μm ]

| λ (nm) | REFRACTIVE INDEX | | $N_{TE}$ | $N_{TM}$ | Δn k=0.55 | d·Δn (μm) |
|---|---|---|---|---|---|---|
| | $LiNbO_3$ LAYER | $MgF_2$ LAYER | | | | |
| 400 | 2.3305 | 1.384 | 1.962 | 1.725 | 0.237 | 0.475 |
| 450 | 2.2834 | 1.381 | 1.930 | 1.712 | 0.219 | 0.437 |
| 500 | 2.2457 | 1.380 | 1.905 | 1.701 | 0.204 | 0.408 |
| 550 | 2.2237 | 1.379 | 1.891 | 1.695 | 0.196 | 0.391 |
| 600 | 2.2082 | 1.378 | 1.880 | 1.690 | 0.190 | 0.380 |
| 650 | 2.1990 | 1.377 | 1.874 | 1.688 | 0.187 | 0.373 |
| 700 | 2.1874 | 1.376 | 1.866 | 1.684 | 0.182 | 0.365 |

[ECB LCD]

| λ (nm) | Δn | d·Δn (d=4.5μm) |
|---|---|---|
| 400 | 0.1360 | 0.612 |
| 450 | 0.1310 | 0.590 |
| 500 | 0.1270 | 0.572 |
| 550 | 0.1240 | 0.558 |
| 600 | 0.1210 | 0.545 |
| 650 | 0.1190 | 0.536 |
| 700 | 0.1180 | 0.531 |

[ RETARDATION COMPENSATION FILM (4): d=3.6μm ]

| λ (nm) | REFRACTIVE INDEX | | $N_{TE}$ | $N_{TM}$ | Δn k=0.55 | d·Δn (μm) |
|---|---|---|---|---|---|---|
| | $LiNbO_3$ LAYER | $SiO_2$ LAYER | | | | |
| 400 | 2.3305 | 1.480 | 1.993 | 1.806 | 0.187 | 0.675 |
| 450 | 2.2834 | 1.476 | 1.961 | 1.790 | 0.172 | 0.618 |
| 500 | 2.2457 | 1.472 | 1.936 | 1.777 | 0.159 | 0.573 |
| 550 | 2.2237 | 1.470 | 1.921 | 1.769 | 0.152 | 0.548 |
| 600 | 2.2082 | 1.468 | 1.911 | 1.763 | 0.148 | 0.531 |
| 650 | 2.1990 | 1.467 | 1.905 | 1.760 | 0.145 | 0.522 |
| 700 | 2.1874 | 1.465 | 1.897 | 1.755 | 0.141 | 0.509 |

[ RETARDATION COMPENSATION FILM (5): d=2.8μm ]

| λ (nm) | REFRACTIVE INDEX | | $N_{TE}$ | $N_{TM}$ | Δn k=0.55 | d·Δn (μm) |
|---|---|---|---|---|---|---|
| | $LiNbO_3$ LAYER | $MgF_2$ LAYER | | | | |
| 400 | 2.3305 | 1.384 | 1.962 | 1.725 | 0.237 | 0.475 |
| 450 | 2.2834 | 1.381 | 1.930 | 1.712 | 0.219 | 0.437 |
| 500 | 2.2457 | 1.380 | 1.905 | 1.701 | 0.204 | 0.408 |
| 550 | 2.2237 | 1.379 | 1.891 | 1.695 | 0.196 | 0.391 |
| 600 | 2.2082 | 1.378 | 1.880 | 1.690 | 0.190 | 0.380 |
| 650 | 2.1990 | 1.377 | 1.874 | 1.688 | 0.187 | 0.373 |
| 700 | 2.1874 | 1.376 | 1.866 | 1.684 | 0.182 | 0.365 |

[ RETARDATION COMPENSATION FILM (6): d=8.7 μm ]

| λ (nm) | REFRACTIVE INDEX | | $N_{TE}$ | $N_{TM}$ | Δn k=0.55 | d·Δn (μm) |
|---|---|---|---|---|---|---|
| | $Y_2O_3$ LAYER | $SiO_2$ LAYER | | | | |
| 400 | 1.9820 | 1.480 | 1.774 | 1.701 | 0.072 | 0.629 |
| 450 | 1.9612 | 1.476 | 1.759 | 1.691 | 0.068 | 0.594 |
| 500 | 1.9470 | 1.472 | 1.749 | 1.684 | 0.066 | 0.570 |
| 550 | 1.9370 | 1.470 | 1.742 | 1.679 | 0.064 | 0.554 |
| 600 | 1.9289 | 1.468 | 1.737 | 1.675 | 0.062 | 0.541 |
| 650 | 1.9228 | 1.467 | 1.732 | 1.671 | 0.061 | 0.531 |
| 700 | 1.9182 | 1.465 | 1.729 | 1.669 | 0.060 | 0.525 |

[ RETARDATION COMPENSATION FILM (7): d=13.3 μm ]

| λ (nm) | REFRACTIVE INDEX | | $N_{TE}$ | $N_{TM}$ | Δn k=0.55 | d·Δn (μm) |
|---|---|---|---|---|---|---|
| | MgO LAYER | MgF$_2$ LAYER | | | | |
| 400 | 1.7621 | 1.384 | 1.603 | 1.558 | 0.045 | 0.602 |
| 450 | 1.7523 | 1.381 | 1.596 | 1.552 | 0.044 | 0.581 |
| 500 | 1.7454 | 1.380 | 1.591 | 1.549 | 0.043 | 0.566 |
| 550 | 1.7404 | 1.379 | 1.588 | 1.546 | 0.042 | 0.556 |
| 600 | 1.7367 | 1.378 | 1.585 | 1.544 | 0.041 | 0.548 |
| 650 | 1.7337 | 1.377 | 1.583 | 1.542 | 0.041 | 0.542 |
| 700 | 1.7314 | 1.376 | 1.581 | 1.541 | 0.040 | 0.538 |

FIG. 27

[ TN LIQUID CRYSTAL DEVICE ]

| λ (nm) | Δn | d·Δn (d=2.0μm) | Re (0.7×d·Δn) |
|---|---|---|---|
| 400 | 0.1360 | 0.272 | 0.190 |
| 450 | 0.1310 | 0.262 | 0.183 |
| 500 | 0.1270 | 0.254 | 0.178 |
| 550 | 0.1240 | 0.248 | 0.174 |
| 600 | 0.1210 | 0.242 | 0.169 |
| 650 | 0.1190 | 0.238 | 0.167 |
| 700 | 0.1180 | 0.236 | 0.165 |

FIG. 28

[ RETARDATION COMPENSATION FILM (8): d=0.9μm ]

| λ (nm) | REFRACTIVE INDEX | | $N_{TE}$ | $N_{TM}$ | Δn k=0.55 | d·Δn (μm) |
|---|---|---|---|---|---|---|
| | $TiO_2$ LAYER | $SiO_2$ LAYER | | | | |
| 400 | 2.5530 | 1.480 | 2.138 | 1.858 | 0.280 | 0.252 |
| 450 | 2.4492 | 1.476 | 2.069 | 1.831 | 0.238 | 0.214 |
| 500 | 2.3783 | 1.472 | 2.021 | 1.811 | 0.210 | 0.189 |
| 550 | 2.3404 | 1.470 | 1.996 | 1.800 | 0.196 | 0.177 |
| 600 | 2.3095 | 1.468 | 1.976 | 1.791 | 0.185 | 0.167 |
| 650 | 2.2885 | 1.467 | 1.962 | 1.784 | 0.178 | 0.160 |
| 700 | 2.2735 | 1.465 | 1.952 | 1.779 | 0.173 | 0.155 |

[ RETARDATION COMPENSATION FILM (9): d=1.12μm ]

| λ (nm) | REFRACTIVE INDEX | | $N_{TE}$ | $N_{TM}$ | Δn k=0.55 | d·Δn (μm) |
|---|---|---|---|---|---|---|
| | LiNbO₃ LAYER | SiO₂ LAYER | | | | |
| 400 | 2.3305 | 1.480 | 1.993 | 1.806 | 0.187 | 0.210 |
| 450 | 2.2834 | 1.476 | 1.961 | 1.790 | 0.172 | 0.192 |
| 500 | 2.2457 | 1.472 | 1.936 | 1.777 | 0.159 | 0.178 |
| 550 | 2.2237 | 1.470 | 1.921 | 1.769 | 0.152 | 0.171 |
| 600 | 2.2082 | 1.468 | 1.911 | 1.763 | 0.148 | 0.165 |
| 650 | 2.1990 | 1.467 | 1.905 | 1.760 | 0.145 | 0.162 |
| 700 | 2.1874 | 1.465 | 1.897 | 1.755 | 0.141 | 0.158 |

[ RETARDATION COMPENSATION FILM (10): d=4.1 μm ]

| λ (nm) | REFRACTIVE INDEX | | $N_{TE}$ | $N_{TM}$ | Δn k=0.55 | d·Δn (μm) |
|---|---|---|---|---|---|---|
| | MgO LAYER | MgF₂ LAYER | | | | |
| 400 | 1.7621 | 1.384 | 1.603 | 1.558 | 0.045 | 0.185 |
| 450 | 1.7523 | 1.381 | 1.596 | 1.552 | 0.044 | 0.179 |
| 500 | 1.7454 | 1.380 | 1.591 | 1.549 | 0.043 | 0.174 |
| 550 | 1.7404 | 1.379 | 1.588 | 1.546 | 0.042 | 0.171 |
| 600 | 1.7367 | 1.378 | 1.585 | 1.544 | 0.041 | 0.169 |
| 650 | 1.7337 | 1.377 | 1.583 | 1.542 | 0.041 | 0.167 |
| 700 | 1.7314 | 1.376 | 1.581 | 1.541 | 0.040 | 0.166 |

[ RETARDATION COMPENSATION FILM (11): d=1.85μm ]

| λ (nm) | REFRACTIVE INDEX | | $N_{TE}$ | $N_{TM}$ | Δn k=0.55 | d·Δn (μm) |
|---|---|---|---|---|---|---|
| | $Y_2O_3$ LAYER | $MgF_2$ LAYER | | | | |
| 400 | 1.9820 | 1.384 | 1.738 | 1.633 | 0.105 | 0.195 |
| 450 | 1.9612 | 1.381 | 1.725 | 1.625 | 0.100 | 0.185 |
| 500 | 1.9470 | 1.380 | 1.715 | 1.619 | 0.096 | 0.178 |
| 550 | 1.9370 | 1.379 | 1.708 | 1.615 | 0.093 | 0.173 |
| 600 | 1.9289 | 1.378 | 1.703 | 1.612 | 0.091 | 0.169 |
| 650 | 1.9228 | 1.377 | 1.699 | 1.609 | 0.090 | 0.166 |
| 700 | 1.9182 | 1.376 | 1.696 | 1.607 | 0.089 | 0.164 |

RETARDATION COMPENSATOR AND SINGLE-PANEL TYPE COLOR LIQUID CRYSTAL PROJECTOR

BACKGROUND OF THE INVENTION

1. Field of the Invention

The present invention relates to a retardation compensator that is suitable for a liquid crystal projector having single liquid crystal device for full color display, and a single-panel type color liquid crystal projector having the retardation compensator.

2. Description of the Related Art

Besides the three-panel type liquid crystal projector with three liquid crystal devices for blue, green and red images, there are single-panel type liquid crystal projectors. In the single-panel type liquid crystal projector, blue, green and red lights, separated by space division system or time division system, enter the single liquid crystal device. The liquid crystal device has plural pixels arranged in matrix to modulate the corresponding color lights based on the pixel image data. In the space division system, each pixel of the liquid crystal device is illuminated by each of the three color lights. In order to achieve this, as described in U.S. Pat. No. 5,161,042, the liquid crystal device has a micro color filters, three color lights enter the liquid crystal device simultaneously with different incident angles, or a micro lens array in the liquid crystal device guides each of the color lights to the corresponding pixel. In the time division system, blue, green and red color lights sequentially enter the liquid crystal device that is driven by the corresponding color image data. Thereby, a full color image from the liquid crystal device is projected onto a screen Although various types of liquid crystal devices are available to the liquid crystal projector, TN (Twisted Nematic) type liquid crystal device is mainly used. The TN type liquid crystal device has a liquid crystal layer between a pair of substrates. The orientations of major axes of liquid crystal molecules in the liquid crystal layer are kept parallel to the substrates, and rotated gradually around the thickness direction so that the major axes of the liquid crystal molecules twist smoothly by 90 degrees along a path from one substrate and the other substrate. The liquid crystal molecule layer is sandwiched by a pair of polarizing plates (polarizer and analyzer). The polarization axes of the polarizing plates for a normally white liquid crystal device are perpendicular to each other (cross nicol configuration). The polarization axes of the polarizing plates for a normally black liquid crystal device are parallel to each other (parallel nicol configuration).

The liquid crystal device can display an image by use of its optical rotatory effect. In the normally white type liquid crystal device, incident light is linearly polarized by the first polarizing plate. When no voltage is applied to a non-selected pixel in the liquid crystal device, the liquid crystal molecules in the liquid crystal layer are twisted so as to rotate the polarization direction of linearly polarized light by 90 degrees. Linearly polarized light through the liquid crystal layer can pass the second polarizing plate, so that the non-selected pixel appears as a white state. When a certain level of voltage is applied to a selected pixel, twisted alignment of the liquid crystal molecules does not appear. In that case, the polarization direction of linearly polarized light is not rotated in the liquid crystal layer, so linearly polarized light is blocked by the second polarizing plate. Thus, the selected pixel appears as a black state.

The liquid crystal device has the disadvantage of narrow viewing angle because of its birefringence. Birefringence becomes dominant as the applied voltage to the liquid crystal layer increases. Although incident light perpendicular to the liquid crystal device is completely blocked in the black state, the liquid crystal layer exhibits birefringence to oblique incident light to change linearly polarized light into elliptical polarized light. Since elliptical polarized light can pass the second polarizing plate, leakage of incident light causes the decrease in the black density of the selected pixel.

Such birefringence of the liquid crystal molecules appears at a state between the white and black states, so oblique incident light partially leaks. Thus, the contrast ratio of the image on the liquid crystal device decreases if viewed obliquely. Any type of the liquid crystal device has, more or less, such birefringence.

A direct view type liquid crystal display to observe the image directly has a retardation compensator for the purpose of decreasing birefringent effect. As the retardation compensator, "Fuji WV Film Wide View A" (trade name, hereinafter referred to as "WV Film"), manufactured by Fuji Photo Film Co., Ltd., has been in the market. A form birefringence layer with layered thin films is used as the retardation compensator to prevent the decrease in the contrast ratio of the obliquely viewed image, as described in the non-patent publication, Eblen J. P., "Birefringent Compensators for Normally White TN-LCDs", SID Symposium Digest, Society for Information Display, 1994, pp. 245-248. In addition, U.S. Pat. No. 5,638,197 describes a retardation compensator in which thin film is obliquely deposited on a substrate.

The retardation compensators described above are utilized to the direct view type liquid crystal display in which an observer right in front of the display panel observes the image at a distance more than the distance of distinct vision. In the direct view type liquid crystal display, the observer can adjust the contrast ratio of the image in the edge area by moving the eye positions slightly. If the image is observed by plural observers at the same moment, low contrast ratio area unlikely occurs because the distance between the displayed image and the observers is large enough to decrease the viewing angle.

In the liquid crystal projector, incident light through the liquid crystal layer is projected to the screen through a projection lens system. The light intensity of each pixel on the screen is the sum of the modulated light intensity passing through the corresponding pixel of the liquid crystal device. The contrast ratio of the displayed image on the screen would decrease if the oblique incident light to the liquid crystal layer is of low contrast ratio. Then, it is impossible to increase the contrast ratio of the projected image even if the observer changes the viewing angle. The projection lens system with large back focus can increase the contrast ratio of the projected image because such lens system decreases the incident angles of incident light to the liquid crystal layer. Such projection lens system, however, is disadvantageous in terms of making the projector smaller.

Accordingly, the technique to increase the viewing angle of the liquid crystal display is effective in order to solve the contrast ratio problem of the liquid crystal projector. For instance, US Patent Application Publication No. 2002/0018162 and Japanese Laid-Open Patent Publications (JP-A) No. 2002-031782 describe the technique to increase the contrast ratio of the projected image by applying the retardation compensator to the liquid crystal device for the liquid crystal projector. The liquid crystal projector in US Patent Application Publication No. 2002/0018162 describes organic materials, such as the WV Film, as the retardation compensator for the TN type liquid crystal device. The retardation compensator in JP-A No. 2002-031782 discloses a uniaxial birefringent crystal, such as single crystal sapphire and crystal. In addition, JP-A No. 2002-131750 describes a Discotic type liquid crystal as the retardation compensator.

The retardation compensators described above utilizes optical anisotropy effect depending upon the incident angle of oblique incident light. Such anisotropy effect of the retardation compensator can prevent the decrease in the contrast ratio of the projected image which is caused by oblique emanation light through the liquid crystal device with large emanation angle.

The organic retardation compensator tends to be colored by long exposure to light containing ultraviolet component. Intensity of the light source in the liquid crystal projector has to be higher than that of the direct view type liquid crystal display. Higher intensity of the light source causes excessive heat to the retardation compensator. The retardation compensator tends to be colored brown in 2000 to 3000 hours. Because of such low durability, it is difficult to utilize the organic retardation compensator to the home use liquid crystal projection TV.

The retardation compensator made of sapphire or crystal has durability enough for long-term use, but the sapphire and crystal are expensive. Moreover, the cut surface and the thickness of the sapphire or crystal must be controlled precisely to exhibit desired optical characteristics. Furthermore, the orientation of the retardation compensator of sapphire or crystal must be aligned precisely in the assembly of the projection optical system. Accordingly, sapphire or crystal retardation compensator is not appropriate for household type liquid crystal projector in terms of manufacture cost, regardless of great durability.

Although the form birefringence having a microscopic structure to exhibit optical anisotropy is effective to solve the above problems, the optical anisotropy of the form birefringence has wavelength dependence. The form birefringence can properly compensate the retardation of a light with narrow wavelength range, such as display light for an instrument described in the above non-patent publication. However, such form birefringence causes wavelength dependence in compensating the phase retardation of the single-panel type liquid crystal projector to display a full color image. For instance, the intensity of the black state pixel increases so that the contrast ratio of the pixel image decreases. Moreover, the black pixel may be colored because of the change in the color balance.

SUMMARY OF THE INVENTION

An object of the present invention is to provide a retardation compensator, at a low manufacture cost, that can improve the contrast ratio and the color balance of the image displayed by a liquid crystal device of a single-panel type liquid crystal projector.

Another object of the present invention is to increase durability of the retardation compensation system enough for long-term use, such as a household television.

Still further object of the present invention is to provide a single-panel type liquid crystal projector having the above retardation compensator.

To achieve the above objects, the retardation compensator according to the present invention comprises a form birefringence in which the absolute value of the retardation, defined as the product of the birefringence and the thickness in the optical axis direction, agrees with the absolute value of the retardation of the liquid crystal layer at least at one wavelength in the visible band. The form birefringence exhibits optical anisotropy due to its microscopic structure smaller than the wavelength of the incident light. A preferable example of the form birefringence is a retardation compensation film in which inorganic thin film layers of high refractive index and low refractive index are alternately deposited.

For the purpose of obtaining the microscopic structure smaller than the wavelength of incident light, each of the thin films needs to have a thickness between $1/100$ and $1/5$ of the standard wavelength of blue light, the shortest primary color in the visible band. In the event of utilizing the above retardation compensation film as the form birefringence, forming the high refractive index layers from the same material and forming the low refractive index layers from the same material is advantageous in productivity and reducing the manufacture cost. Moreover, a single-panel type liquid crystal projector with such retardation compensator is also within the scope of the present invention.

The basic function of the retardation compensator according to the present invention will be explained. In FIG. 1, a liquid crystal device 2 has a liquid crystal layer 5 that is sandwiched between a transparent base substrate 3b and an opposite substrate 3a having orientation films on both inner surfaces. The liquid crystal layer 5 is composed of liquid crystal molecules. In order to drive the liquid crystal layer 5 of each pixel, the substrates 3a, 3b have matrix electrodes, common electrodes and transparent electro-conductive films, which are not illustrated in the drawing. In an upstream side of the liquid crystal device 2 with respect to the light path, there is a polarizer to change an incident light S1 into linearly polarized light that enters the liquid crystal device 2.

The liquid crystal layer 5 with elongated liquid crystal molecules works as a positive retarder. Thus, the incident light S1 is separated into an ordinary component So and an extraordinary component Se during the passage through the liquid crystal layer 5. There is a phase shift between the extraordinary component Se and the ordinary component So. The phase retardation P1 depends on the product of a birefringence value $\Delta n1$ of liquid crystal molecules and a thickness d1 of the liquid crystal layer 5. In terms of crystal optics, the product $\Delta n1 \cdot d1$ is defined as retardation R1. Then, the phase retardation P1 is defined as $\alpha \cdot R1$ $(=\alpha \cdot \Delta n1 \cdot d1)$. The coefficient $\alpha$ takes a value between 0 and 1, in accordance with the incident angle $\theta$ of incident light S1, orientation of the liquid crystal molecules, applied voltage to the liquid crystal layer 5, and so forth.

An emanated light S2 from the liquid crystal device 2 is composed of the ordinary component So and the extraordinary component Se that has phase retardation to the ordinary component So. Thus, the emanated light S2 has an elliptically polarized component depending upon the phase retardation R1, even if the incident light S1 is linearly polarized. For the purpose of deleting the elliptically polarized component, the phase retardation is compensated by disposing a phase compensator 6 between the emanation side surface of the liquid crystal device 2 and an analyzer.

The retardation compensator 6 is an inorganic form birefringence having microscopic structure smaller than the wavelength of the incident light. An example of the retardation compensator 6, shown in FIG. 2, comprises a retardation compensation film 8 having plural dielectric thin film layers L1, L2 that are alternately layered on a transparent glass substrate 7. The refractive indices of the thin film layers L1, L2 are different from each other. The optical thickness (the product of the physical thickness and the refractive index) of each layer is smaller than the wavelength $\lambda$ of incident light. The optical thickness of each layer is preferably from $\lambda/100$ to $\lambda/5$, more preferably from $\lambda/50$ to $\lambda/5$, and practically from $\lambda/30$ to $\lambda/10$. Thereby, it is possible to easily form a uniaxial birefringent plate with negative birefringence vale Δn2 (c-plate). The retardation compensator 6 is located such that the surfaces of the thin film layers are perpendicular to the optical axis of incident light.

As for the examples of the optical devices with plural dielectric layers, a dichroic mirror, a polarization beam splitter, a color composition prism and anti-reflection coating are well known. The optical thickness of each layer is designed to be integer multiplication of λ/4 so that the optical devices exhibit optical interference. On the other hand, the optical thickness of each thin film layer L1, L2 in the retardation compensation film 8 is less than λ/4. Moreover, the optical thickness of each thin film layer is controlled to obtain a desired birefringence value Δn2. Thus, it is clear that the form birefringence in the retardation compensator exhibits different optical function from other optical devices.

The retardation compensator 6 works as a negative retarder to delay the phase of the ordinary component So to the extraordinary component Se. Although the structure of the phase compensation film 8 is different from the liquid crystal molecules in terms of crystal optics, retardation of the phase compensation film 8 is defined as the product of the birefringence value Δn2, which comes from its anisotropy, and the thickness d2 of the phase compensation film 8. The phase retardation P2 between the ordinary and extraordinary components is β·R2 (=·Δn2·d2). If the condition P1=P2 is satisfied, the emanated light S3 from the retardation compensator 6 becomes linearly polarized light because the retardation due to the liquid crystal device 2 and the retardation compensator 6 are cancelled with each other. Since a linearly polarized light enters the analyzer, disposed downstream of the phase compensator 6, it is possible to increase the image contrast effectively.

Although the coefficients α, β change in accordance with the incident angle θ, the influence of the incident angle θ may be disregarded if the light ray passes the liquid crystal device 2 and retardation compensator 6 at a same incident angle. Accordingly, in order to determine the coefficient α to satisfy P1=P2, it is possible to consider only the factors depending upon the liquid crystal device 2, such as orientation of the liquid crystal molecules and the applied voltage to the liquid crystal device 2. Note that whether the birefringence value Δn1, Δn2 takes a positive value or negative value will be specified, if necessary.

As explained above, the objects of the present invention are achieved by making the phase retardation P2 of the retardation compensator 6 as close as possible to the phase retardation P1 of the liquid crystal device 2, in other words, by equating the retardations R1 and R2. The liquid crystal device 2, however, has various types, such as the TN (Twisted Nematic) type and the ECB (Electrically Controlled Birefringence) type. In addition, the retardation compensator 6 has various structures such as uniaxial structure (a-plate and o-plate, for instance) and a layered structure. Thus, in order to make the retardation R2 as close as possible to the retardation R1, it is necessary to adjust the parameters (d2, Δn2) in consideration of the type of the retardation compensator 6 and the liquid crystal device 2. In the preferred embodiments, the parameters (d2, Δn2) are decided to compensate the retardation of the liquid crystal device 2 of TN type and ECB type.

It is important to consider that the positive birefringence value Δn1 of the liquid crystal layer 5 and the negative birefringence value Δn2 of the retardation compensation film 8 have wavelength dependences. If the birefringence values Δn1, Δn2 do not have wavelength dependence, or if their wavelength dependences are approximately the same, the wavelength of incident light as well as the incident angle may be disregarded in deciding the retardation R2 of the retardation compensator 8. Since the wavelength dependences of the birefringence values Δn1, Δn2 are different from each other, however, it is necessary to consider this factor.

Wavelength dependence of the retardation R1 (=Δn1·d1) of a conventional liquid crystal layer 5 and the wavelength dependence of the retardation R2 (=Δn2·d2) of the phase compensation film 8 are shown in FIG. 3. In the visible band, the retardation R1 is large in the short wavelength side; and gradually decreases as the wavelength becomes longer. Although the retardation R2 of the retardation compensation film 8, composed of TiO₂ layers and SiO₂ layers (widely used thin film materials), is large in the short wavelength side and is small in the long wavelength side, the retardation R2 changes more rapidly than the retardation R1 in short wavelength side. Because the other parameter, thickness is not related to the wavelength, birefringence values Δn1, Δn2 cause the wavelength dependences shown in FIG. 3.

In FIG. 3, the thickness d2 of the retardation compensation film 8 with predetermined birefringence value Δn2 is adjusted such that the retardation R2 comes as close as possible to the predetermined retardation R1 of the liquid crystal layer 5 in the visible band. More specifically, the thickness d2 of the retardation compensation film 8 is adjusted such that the area between the characteristic curves of the retardations R1, R2 becomes as small as possible. Although it is necessary to consider the slopes of the characteristic curves, the thickness d2 of the retardation compensation film 8 may be adjusted such that the both characteristic curves are crossed at least one wavelength in the visible band.

The characteristic curve of the retardation R2 shifts vertically in the graph by changing the total thickness d2 of the retardation compensation film 8, provided that the retardation R1 of the liquid crystal layer 5 takes a constant value. The thicknesses and the refractive indices of the thin film layers L1, L2 of the retardation compensation film 8 determine the birefringence value Δn2 that causes the slope of the characteristic curve. Thus, it is necessary to change the number of the alternate layers while keeping the thickness of each thin film layer constant.

As mentioned above, the birefringence value Δn2 varies in accordance with the thicknesses and the refractive indices of the thin film layers L1, L2 of the retardation compensation film 8. FIG. 4 shows the wavelength dependence of the retardation $R_A$, $R_B$ of two retardation compensation films 8 with different birefringence value Δn2 and same thickness d2. In the short wavelength side, the retardation R2 changes more rapidly than the retardation $R_A$, and the retardation $R_A$ changes more rapidly than the retardation $R_B$. In order to make the retardation $R_A$, $R_B$ closer to the retardation R1 of the liquid crystal layer 5 by increasing the total thickness d2 of the retardation compensation film 8, it is necessary to increase the number of the thin film layers L1, L2.

In the event of applying the liquid crystal device of space division system to the single-plate type liquid crystal projector, each of the pixels in the liquid crystal device must be illuminated by the corresponding primary color light. Although the retardation of the liquid crystal device is compensated effectively, providing each pixel with the retardation compensation film suitable for the corresponding color light causes complicated manufacture process and increase the manufacture cost. In addition, the liquid crystal device of time division system has to modulate the intensity of the three primary color lights. Thus, the retardation R2 of the retardation compensator 8 is adjusted so as to compensate the phase retardation sufficiently for three primary color lights.

It is also important to consider the type of the liquid crystal device. For instance, the ECB type liquid crystal device 2 exhibits the nature of a positive c-plate in terms of crystal optics, because most of the ECB type liquid crystal molecules align perpendicular to the substrate when no voltage is applied. When the polarizer and the analyzer are in cross nicol configuration to exhibit the black state at the time of no applied voltage, optical anisotropy appears in the liquid crystal layer 5 in the thickness direction.

The retardation compensation film 8 with alternately layered high and low refractive index thin films works as a c-plate, although negative, like the ECB type liquid crystal device. Thus, the coefficient $\alpha$ of the phase retardation P1 ($=\alpha \cdot \Delta n1 \cdot d1$) is regarded as 1. Accordingly, the parameters may be decided to satisfy the equation ($\Delta n1 \cdot d1 = \Delta n2 \cdot d2$), that is, to equate the retardation R1 of the liquid crystal layer 5 and the retardation R2 of the retardation compensation film 8.

In the TN type liquid crystal, certain voltage is applied to align the elongated liquid crystal molecules perpendicular to the substrates. However, not all of the liquid crystal molecules near the substrates align perpendicularly. In the black state, 60% to 95%, or 65% to 80% of the liquid crystal molecules align perpendicular to the substrate. Accordingly, it is necessary to decide the parameters by considering that the phase retardation P1 of the liquid crystal layer 5 becomes smaller than the value $\Delta n1 \cdot d1$. To make it simple, the coefficient $\alpha$ may be assumed to be 0.7. In that case, the parameters of the retardation compensation film 8 needs to satisfy the equation $0.7 \times \Delta n1 \cdot d1 = \Delta n2 \cdot d2$. Note that the OCB (Optically Compensatory Bend) type and STN (Super Twisted Nematic) type liquid crystal also have the similar characteristics.

The retardation compensation film 8 is formed from durable inorganic material. As an example, the retardation compensation film 8 is composed of high and low refractive index thin films that are alternately layered.

The wavelength dependence U2 of the birefringence value $\Delta n2$ of the retardation compensation film is defined as follows:

$$U2 = \{\Delta n2_{(450)} - \Delta n2_{(650)}\}/\Delta n2_{(550)}$$

In the above equation, $\Delta n2_{(450)}$, $\Delta n2_{(550)}$ and $\Delta n2_{(650)}$ indicate respectively the birefringence value of the retardation compensation film corresponding to the standard wavelength of blue light (450 nm), green light (550 nm) and red light (650 nm). Wavelength dependence U2 of an inorganic retardation compensation film is 1.10 to 1.50. Similarly, wavelength dependence U1 of birefringence value $\Delta n1$ of the liquid crystal layer is defined as follows. In general, the wavelength dependence U1 is 1.05 to 1.20.

$$U1 = \{\Delta n1_{(450)} - \Delta n1_{(650)}\}/\Delta n1_{(550)}$$

Ideally, the condition U1=U2 is satisfied over the visible band. The value U1 does not change largely because limited kinds of the liquid crystal molecules are practically available. Thus, the retardation compensation film is designed so as to make the wavelength dependence U2 close to U1. The wavelength dependence U2 depends upon the material of the thin film layers of the retardation compensation film. In addition, it is possible to correct the retardation by adjusting the thickness d2 at a specified wavelength.

Accordingly, high and low refractive index materials for the high and low refractive index thin films are selected so as to make the wavelength dependence U2 of the phase compensation film as close as possible to the wavelength dependence U1 of the liquid crystal layer. Then, the thickness d2 of the retardation compensation film is adjusted to compensate the retardation in the visible band. Note that if the wavelength dependences U1 and U2 are the same, retardation over the visible band is properly compensated by adjusting the thickness d2. In consideration of the explanations above, the preferred embodiments will be described with reference to the drawings.

BRIEF DESCRIPTION OF THE DRAWINGS

The above objects and advantages of the present invention will become easily understood by one of ordinary skill in the art when the following detailed description would be read in connection with the accompanying drawings, in which:

FIG. 7 is a table showing physical properties of a TN liquid crystal device;

FIG. 8 is a table showing physical properties of a retardation compensation film (1) for the TN liquid crystal device;

FIG. 27 is a table showing physical properties of the TN liquid crystal device having the reflective color liquid crystal device;

FIG. 28 is a table showing physical properties of a retardation compensation film (8);

PREFERRED EMBODIMENTS OF THE INVENTION

Figure 5:
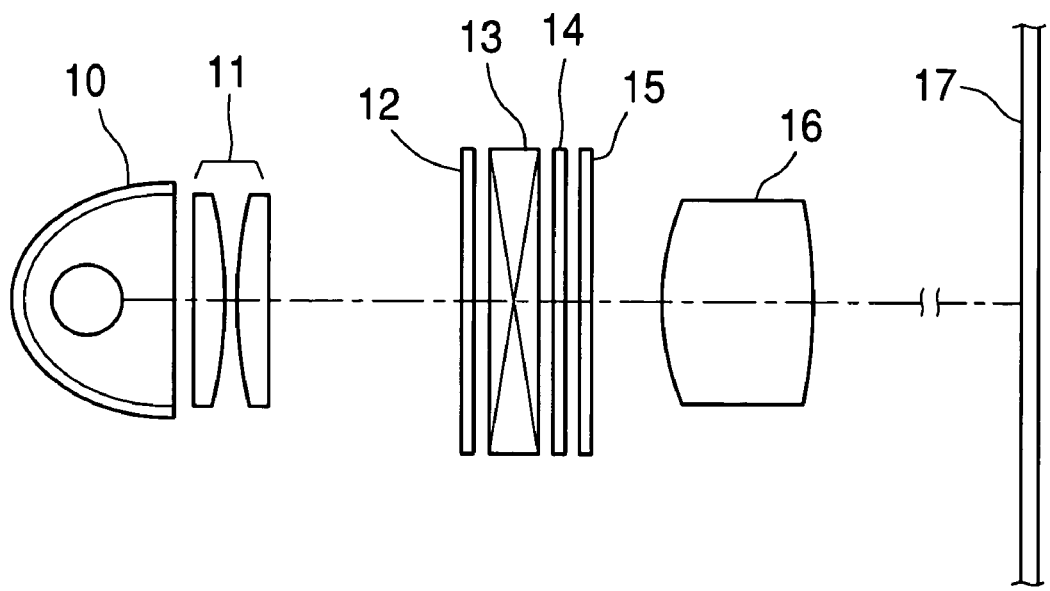
FIG. 5 is a block diagram showing an optical system of the single-plate type liquid crystal projector.

A single-panel type color liquid crystal projector is depicted in FIG. 5. A light source 10 comprises a lamp and a reflector, and emits white light toward a condensing optical system 11. White light is collimated by the condensing optical system 11, and then changed into linearly polarized white light by a first polarizing plate 12. The linearly polarized white light enters a liquid crystal device 13 having plural pixels arranged in matrix. Each pixel of the liquid crystal device 13 is driven to change the transmissive density of corresponding primary color light (blue green or red light) in accordance with corresponding pixel image data. Each pixel of the liquid crystal device 13 has a micro color filter for passing corresponding color light, so that the liquid crystal device 13 emanates full color image light with pixel image lights that are modulated in corresponding pixels.

As mentioned above, the liquid crystal layer in the liquid crystal device 13 exhibits the birefringence effect. Thus, the image light from the liquid crystal device 13 is elliptically polarized because of the phase retardation between the ordinary component So and the extraordinary component Se. A phase compensator 14, disposed behind the liquid crystal device 13, compensate the phase retardation such that the elliptically polarized component of the image light is cancelled. Thereby, the image light is changed into linearly polarized light. Then the image light passes a second polarizing plate 15, in which the polarization direction thereof is perpendicular to that of the first polarizing plate 12 (cross nicol configuration). The image light from the second polarizing plate 15 is projected on a screen through a projection lens unit 16.

Figure 2:
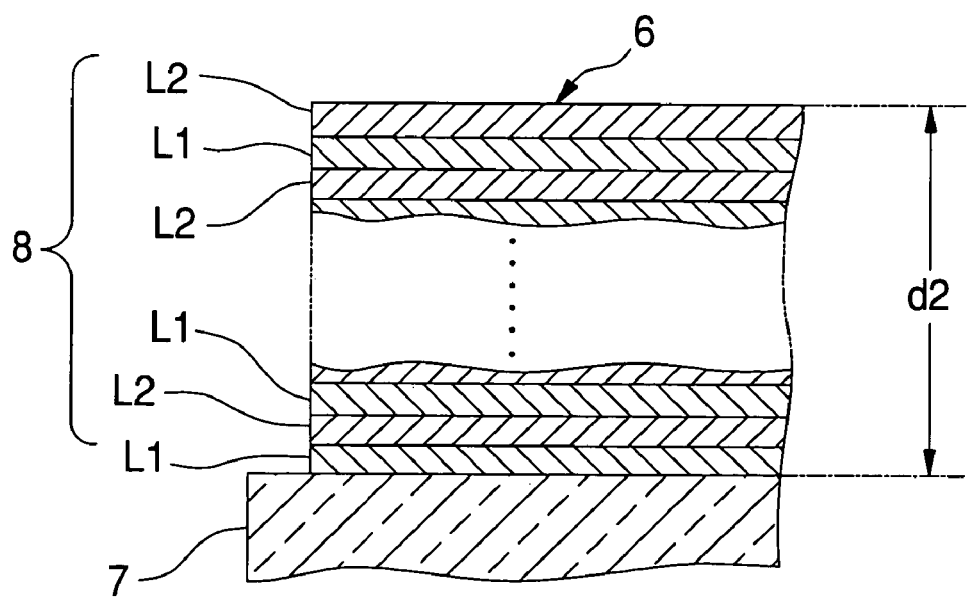
FIG. 2 is a schematic cross section of the retardation compensator.
Figure 3:
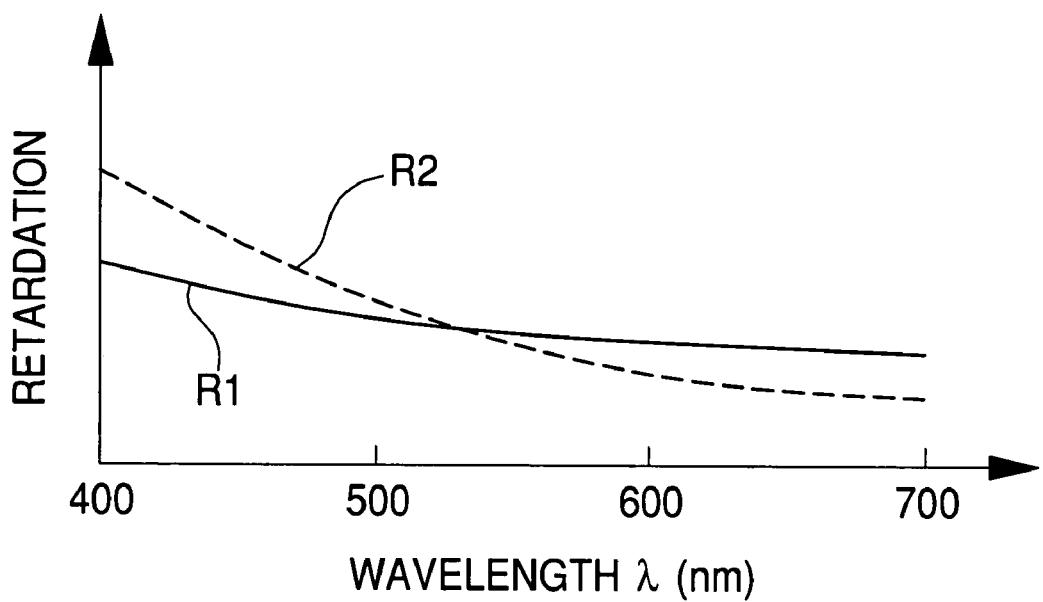
FIG. 3 is a graph showing wavelength dependence in retardation of the liquid crystal device and the retardation compensator.
Figure 4:
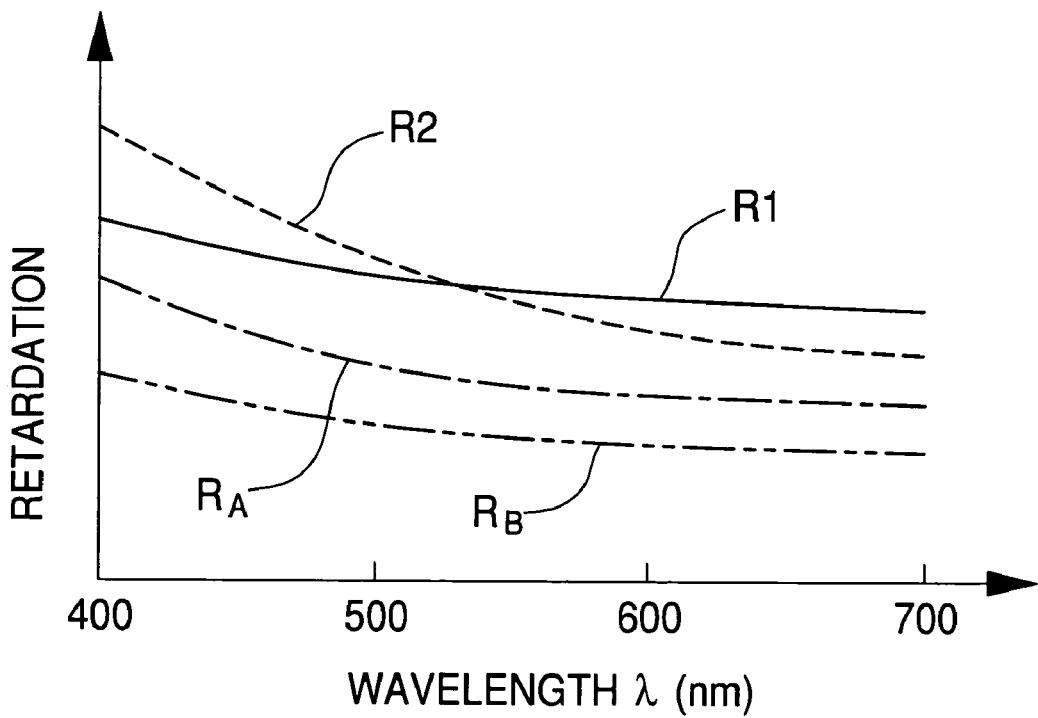
FIG. 4 is a graph showing wavelength dependence in retardation of a form birefringence.
Figure 6:
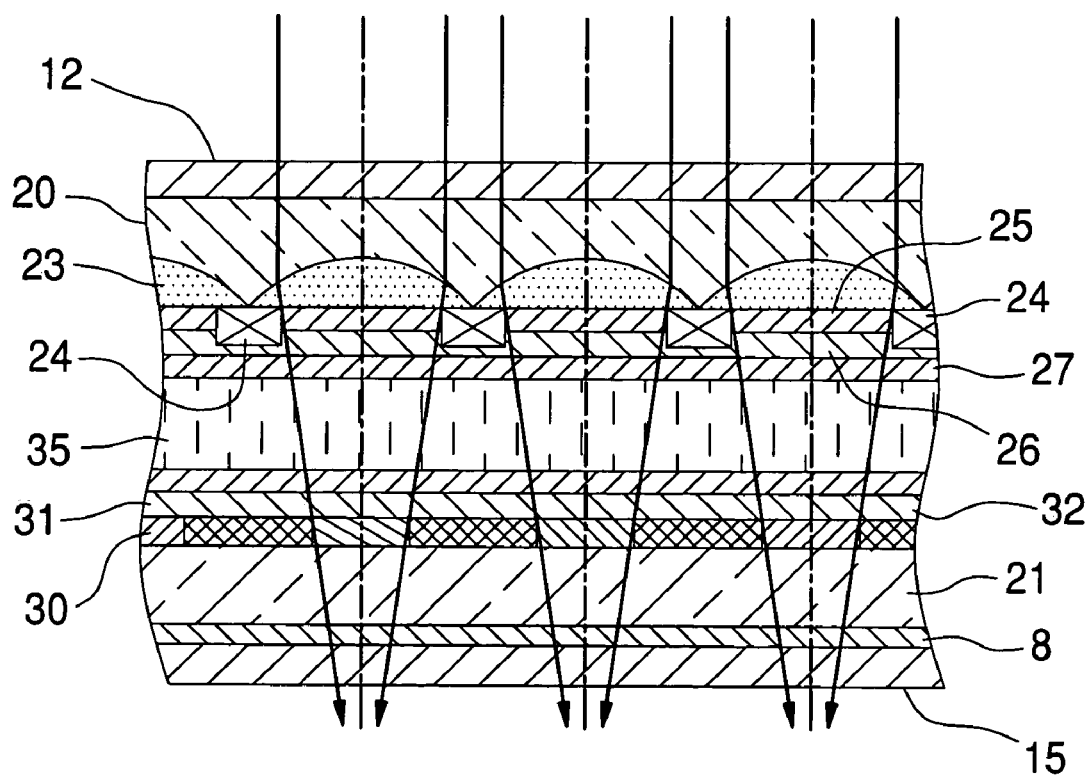
FIG. 6 is a partial cross section of a transmissive color liquid crystal device.

As shown in FIG. 6, the first polarizing plate 12, the liquid crystal device 13, the retardation compensator 14 and the second polarizing plate 15 are integrated to form a liquid crystal panel. The first polarizing plate 12 is on the incident surface of a first glass substrate 20. The retardation compensator 8, having alternately layered thin film layers L1, L2 (see FIG. 2), and the second polarizing plate 15 are provided on the emanation surface of a second glass substrate 21. The liquid crystal device 13 is between the glass substrates 20, 21. Micro lenses 23, formed by ion planting method on the emanation surface of the first glass substrate 20, converges the collimated white incident light, so it is possible to compensate the decrease in aperture ratio due to the electrodes in the liquid crystal device.

On the emanation side of the glass substrate 20, there are opaque electrodes 24 that extend in the direction perpendicular to the drawing. Between the opaque electrodes 24, transparent active electrodes 25 are arranged in matrix to constitute pixel electrodes to apply voltage to the liquid crystal layer pixel by pixel basis. A coating layer 26 is provided to cover the opaque electrodes 24 and the active electrodes 25. An orientation film 27 is layered on the flat emanation surface of the coating layer 26.

In the incident surface side of the glass substrate 21, micro color filters 30, transparent common electrode 31 and an orientation film 32 are layered. A liquid crystal layer 35 between the pair of the orientation films 27, 32 contains liquid crystal molecules. The micro color filters 30 include plural blue, green and red color filters, arranged in matrix on the pixel electrodes 25, to emanate the corresponding color light. Controlling the applied voltage to the active electrode 25 makes it possible to change the intensity of the corresponding color light through the liquid crystal layer 35.

Embodiments of the retardation compensation film 8 will be explained below.

Embodiment 1

Figure 1:
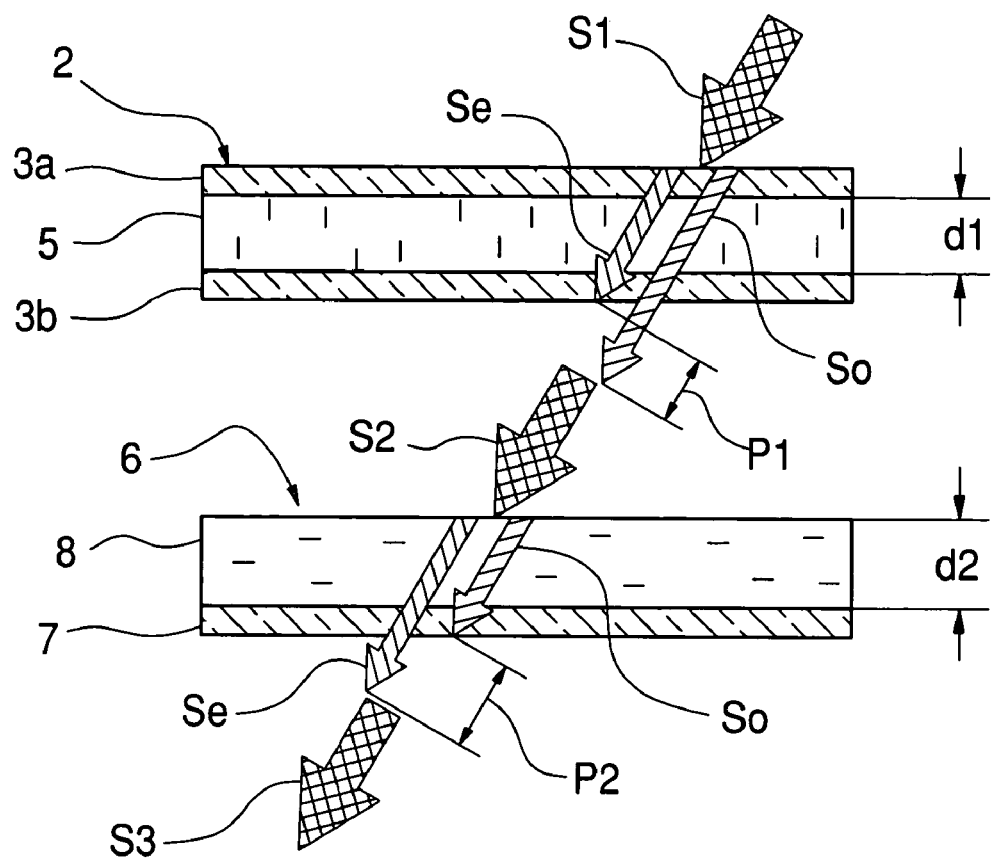
FIG. 1 is an explanatory view of the retardation in the liquid crystal device and the retardation compensator.

As shown in FIG. 7, the retardation d·Δn of nematic liquid crystal material for the TN liquid crystal device has wavelength dependence. Note that the thickness d of the TN liquid crystal device (corresponding to d1 of the liquid crystal layer 5 in FIG. 1) is 4.5 μm. Since all of the liquid crystal molecules in a black state pixel do not orientate perpendicularly, as mentioned above, it is assumed that 70% of the liquid crystal molecules in thickness d cause effective retardation Re to be compensated. The effective retardation Re, calculated by 0.7×d·Δn, is also listed in FIG. 7.

In this embodiment, the liquid crystal device contains cyanocyclohexanes nematic liquid crystal, known as "ZLI-1083" (Trade Name) manufactured by Merck Ltd. The rate of the liquid crystal molecules to cause the effective retardation is not limited to 70%, but may be decided appropriately in accordance with composition and kind of the liquid crystal molecules, applied voltage to the substrates and orientation distribution of the liquid crystal molecules in the liquid crystal device.

In order to adapt the wavelength dependence of the effective retardation Re, the retardation compensation film (1) according to this embodiment is composed of 40 $TiO_2$ film layers and 40 $SiO_2$ film layers that are alternately layered on a substrate. The $TiO_2$ film layer is used as the high refractive index layer, whereas The $SiO_2$ film layer is used as the low refractive index layer. The physical thicknesses of the $TiO_2$ film layer and the $SiO_2$ film layer are 27.5 nm and 22.5 nm (thickness ratio is 11:9), respectively. The physical thickness of the retardation compensation film (1) is 2 μm in total. As shown in FIG. 8, the refractive indices the $TiO_2$ film layer and the $SiO_2$ film layer have wavelength dependence. The measured birefringence Δn of the retardation compensation film (1) has its own wavelength dependence.

The optical thickness of the $TiO_2$ film layer (physical thickness: 27.5 nm) is 70.2 nm even at the wavelength of 400 nm with large refractive index. In addition, the optical thickness of the SiO$_2$ film layer (physical thickness: 22.5 nm) is 33.3 nm at the wavelength of 400 nm. Both optical thicknesses satisfy the condition of λ/5 or less. This condition is satisfied at the standard wavelength of blue (450 nm) and the standard wavelengths of other primary colors. Thus, the thin film layers can exhibit optical anisotropy, needed for compensating retardation, with a structure different from an ordinary interferential thin film in which the optical thickness is integer multiplication of λ/4. On the other hand, when the optical thickness of each thin film layer is less than λ/100, the number of the thin film layers increases to obtain the desired thickness d. This is not practical because of low productivity.

The measured birefringence value Δn of the retardation compensation film (1) of the above structure will be compared with the theoretical value based on the theory of the form birefringence. It is assumed that a retardation compensation film has two kinds of thin film layers, with the physical thickness a, b and the refractive index $n_1$, $n_2$, alternately layered at the period of (a+b). When electromagnetic wave perpendicularly enters the layered surface, the retardation compensation film does not exhibit birefringence effect because the electromagnetic wave has only TE (Transverse Electric) component in which the electric component oscillates in the plane parallel to the layered surfaces. On the other hand, in the event that electromagnetic wave obliquely enters the layered surface, the retardation compensation film exhibits two kinds of refractive indices shown by the following equations.

$$N_{TE} = \{(an_1^2 + bn_2^2)/(a+b)\}^{1/2}$$

$$N_{TM} = \{(a+b)/(a/n_1^2) + (b/n_2^2)\}^{1/2}$$

In the above equation, $N_{TE}$ is effective refractive index of the retardation compensation film to the TE component, and $N_{TM}$ is effective refractive index to TM component in which the electrical component oscillates in the plane perpendicular to the layered surfaces. The difference between $N_{TE}$ and $N_{TM}$ causes birefringence of the retardation compensation film. The theoretical birefringence value Δn is defined as follows:

$$\Delta n = N_{TM} - N_{TE}$$

Figures 9, 10:
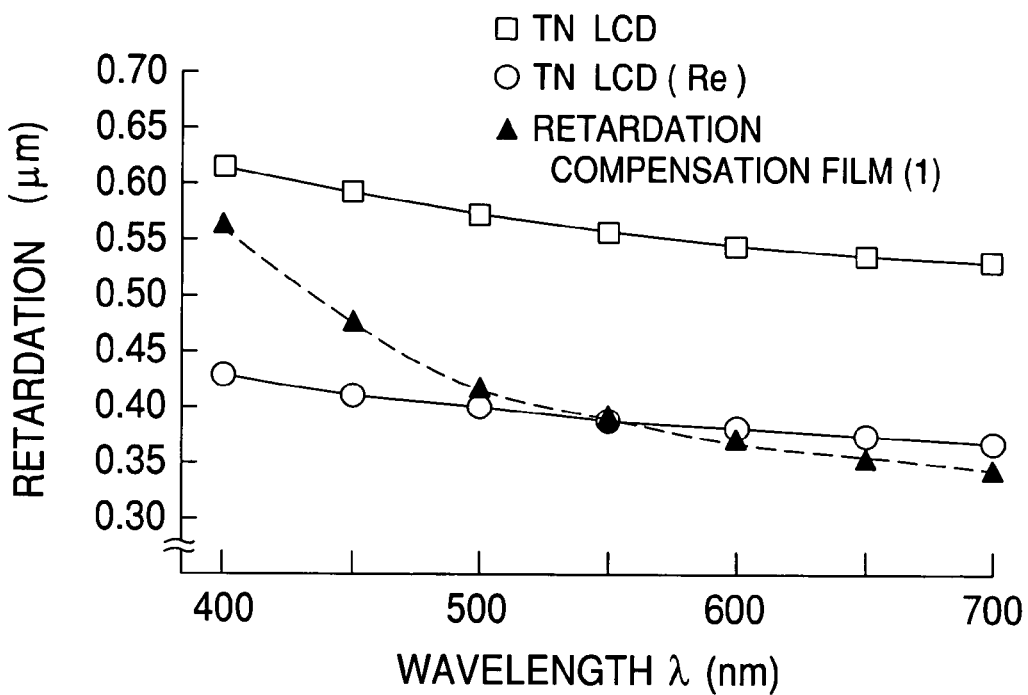
FIG. 9 is a graph showing retardation characteristics of the TN liquid crystal device and the retardation compensation film (1)
FIG. 10 is a table showing physical properties of a retardation compensation film (2)

Referring to FIG. 9, it is clear that the theoretical birefringence value Δn is substantially the same as the measured value. Note that the value k in the section Δn in FIG. 8 is defined as k=a/(a+b).

Retardation d·Δn of the retardation compensation film (1) is defined as the product of the birefringence value Δn and the thickness d (=2 μm) of the retardation compensator. Because of the wavelength dependence of the birefringence value Δn, retardation of the retardation compensation film (1) changes according to the wavelength of incident light. Note that the refractive index column in FIG. 8 shows that TiO$_2$ film layer has more influential to the wavelength dependence of the birefringence value Δn than SiO$_2$ film layer.

The graph in FIG. 9 shows the wavelength dependences of the retardation d·Δn (shown by the marks □) and effective retardation Re (○) of the TN liquid crystal device, and the retardation d·Δn (▲) of the retardation compensation film (1). This graph shows that the effective retardation Re and the retardation of the phase compensation film (1) are the same at the wavelength of about 550 nm (approximately the center of the visible band). If the retardation changes in the manner shown in FIG. 9, the wavelength of agreement between the effective retardation (○) and the retardation (▲) of the retardation compensation film (1) is preferably the wavelength from 450 nm to 650 nm, more preferably from 480 nm to 580 nm. In this case, the phase retardation is not sufficiently compensated in the short wavelength side because of large difference in retardation, compared to the long wavelength side. This will not be practically influential, however, since the sensitivity also becomes smaller in the short wavelength side. The retardation (▲) becomes smaller by changing the number of TiO$_2$ and SiO$_2$ layers. Thus, it is possible to shift the wavelength of agreement in the short wavelength side.

Embodiment 2

Figures 11, 12:
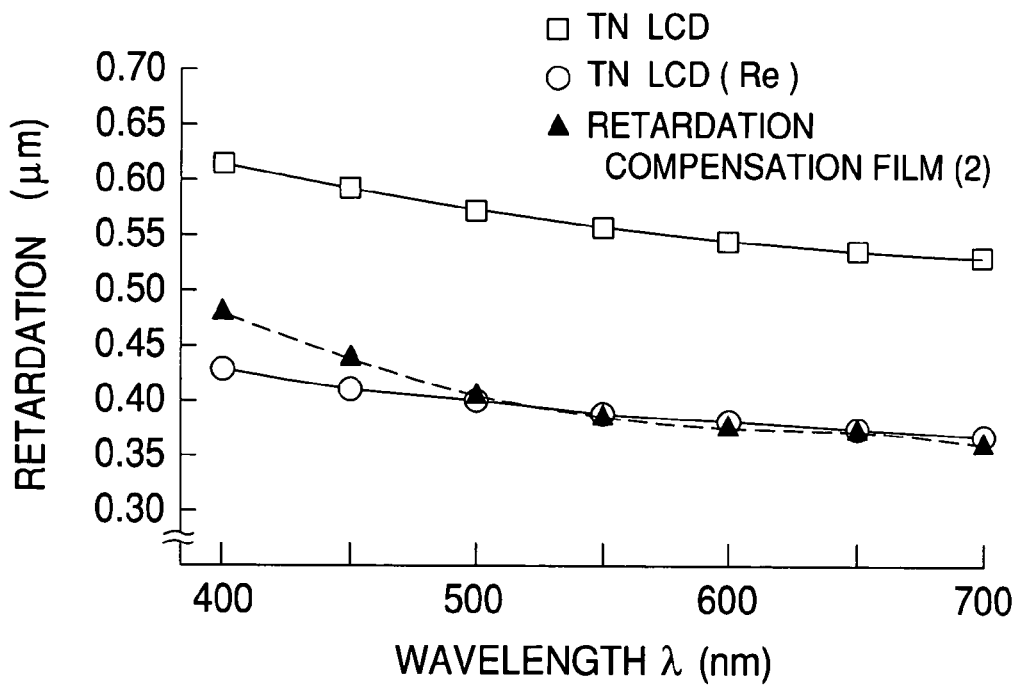
FIG. 11 is a graph showing retardation characteristics of the retardation compensation film (2)
FIG. 12 is a table showing physical properties of a retardation compensation film (3)

FIG. 10 shows the physical properties of the retardation compensation film (2) that is composed of 51 LiNbO$_3$ film layers and 51 SiO$_2$ film layers that are alternately layered on a substrate. The LiNbO$_3$ film layer is used as the high refractive index layer, whereas The SiO$_2$ film layer is used as the low refractive index layer. The physical thicknesses of the LiNbO$_3$ film layer and the SiO$_2$ film layer are 27.5 nm and 22.5 nm, respectively. The physical thickness of the retardation compensation film (2) is 2.55 μm in total. Compared with the Embodiment 1, the birefringence value Δn of the retardation compensation film (2) is smaller, because the refractive index of the LiNbO$_3$ film layer is smaller than that of the TiO$_2$ film layer. However, the wavelength dependence of the retardation compensation film (2) has improved. Referring to FIG. 11 that shows the graph of the wavelength dependence, the retardation (▲) of the retardation compensation film (2) is almost the same as the effective retardation (○) in the long wavelength side. Moreover, it is found that the characteristics of the phase compensation film (2) have improved in the short wavelength side.

Embodiment 3

Figures 13, 14:
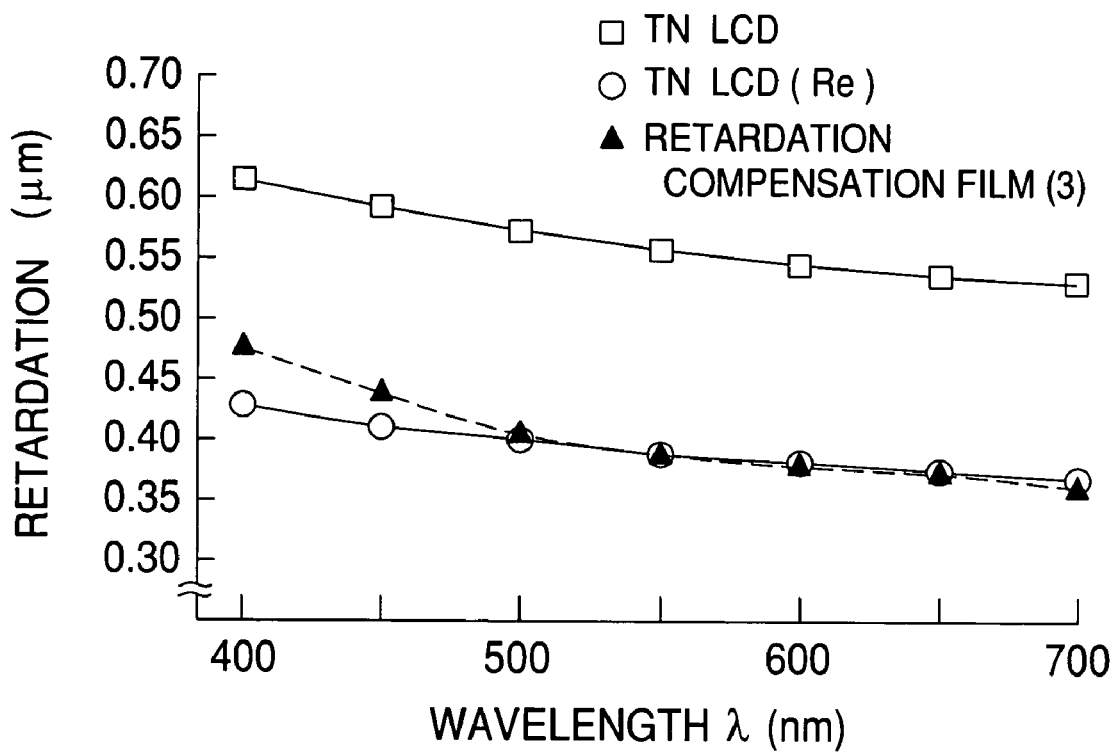
FIG. 13 is a graph showing retardation characteristics of the retardation compensation film (3)
FIG. 14 is a table showing physical properties of an ECB liquid crystal device.

FIG. 12 shows the physical properties of the retardation compensation film (3) that is composed of LiNbO$_3$ film layers and MgF$_2$ film layers that are alternately layered on a substrate. The LiNbO$_3$ film layer is used as the high refractive index layer, whereas the MgF$_2$ film layer is used as the low refractive index layer. The thickness and the number of the LiNbO$_3$ film layer and MgF$_2$ film layer are the same embodiment 1. Referring to FIG. 13 that shows the graph of the wavelength dependence, it is found that the retardation compensation film (3) has the similar retardation compensation characteristics as the retardation compensation film (2) according to Embodiment 2.

As mentioned in the above embodiments, the birefringence value Δn of the retardation compensation film 8 becomes large as the difference in the refractive indices between high and low refractive index layers increases. Thus, when the physical thickness of each layer is constant, increasing the difference in the refractive index is advantageous in decreasing the total thickness of the retardation compensation film. However, the retardation of the material with higher refractive index tends to have large wavelength dependence. In that case, even if the low refractive index material has small wavelength dependence, the difference in the refractive indices becomes large so that the retardation compensation film exhibits wavelength dependence. Thus, the retardation compensation film with higher refractive index material makes it difficult to compensate the retardation sufficiently.

Embodiment 4

The retardation compensation film (4) according to this embodiment is combined with the ECB liquid crystal device. As shown in the physical properties in FIG. 14, the ECB liquid crystal device with the thickness of 4.5 μm has wavelength dependence in the retardation d·Δn. Since the phase retardation of the ECB liquid crystal device is caused by the wavelength dependence of the retardation d·Δn, the retardation of the retardation compensation film may be decided.

Figures 15, 16:
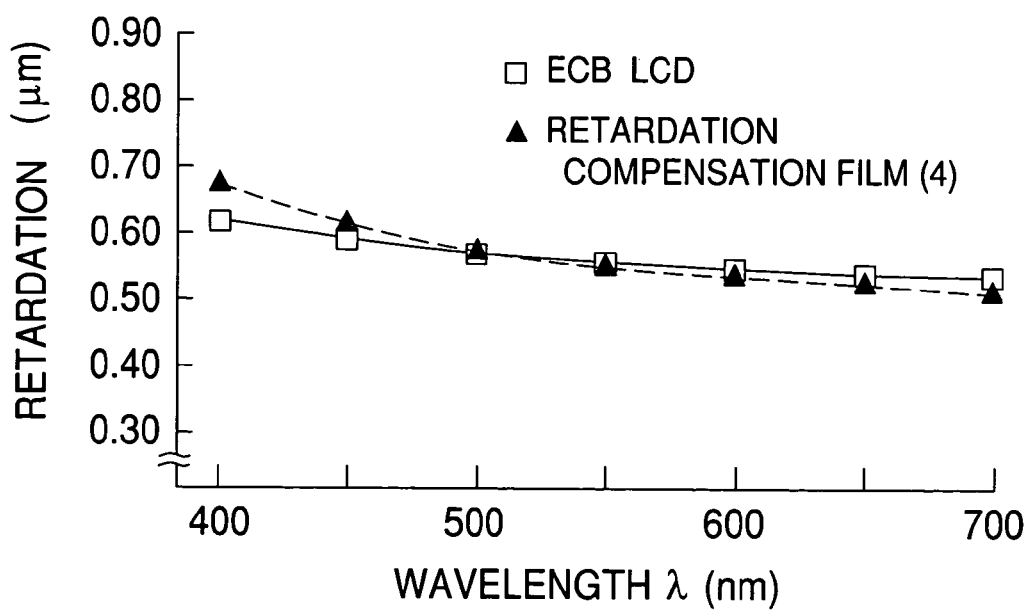
FIG. 15 is a table showing physical properties of a retardation compensation film (4) for the ECB liquid crystal device.
FIG. 16 is a graph showing retardation characteristics of the ECB liquid crystal device and the retardation compensation film (4)

FIG. 15 shows the physical properties of the retardation compensation film (4) for the ECB liquid crystal device. LiNbO$_3$ film layers as the high refractive index layer and SiO$_2$ film layers as the low refractive index layer are adapted for the liquid crystal compensation film (4). The thicknesses of the LiNbO$_3$ film layer and the SiO$_2$ film layer are 33 nm and 27 nm, respectively (k=0.55). 60 LiNbO$_3$ film layers and 60 SiO$_2$ film layer are alternately layered to obtain the total thickness d of 3.6 μm. FIG. 16 shows the graph of wavelength dependence of the retardation (▲) of the retardation compensation film (4) and the effective retardation (□) of the ECB liquid crystal device. This graph shows that the retardation compensation film (4) can compensate the retardation sufficiently in the long wavelength side. Although the retardation of the retardation compensation film (4) is larger than that of the ECB liquid crystal device, this is not practically material because of low visual sensitivity in the short wavelength side.

Embodiment 5

Figures 17, 18:
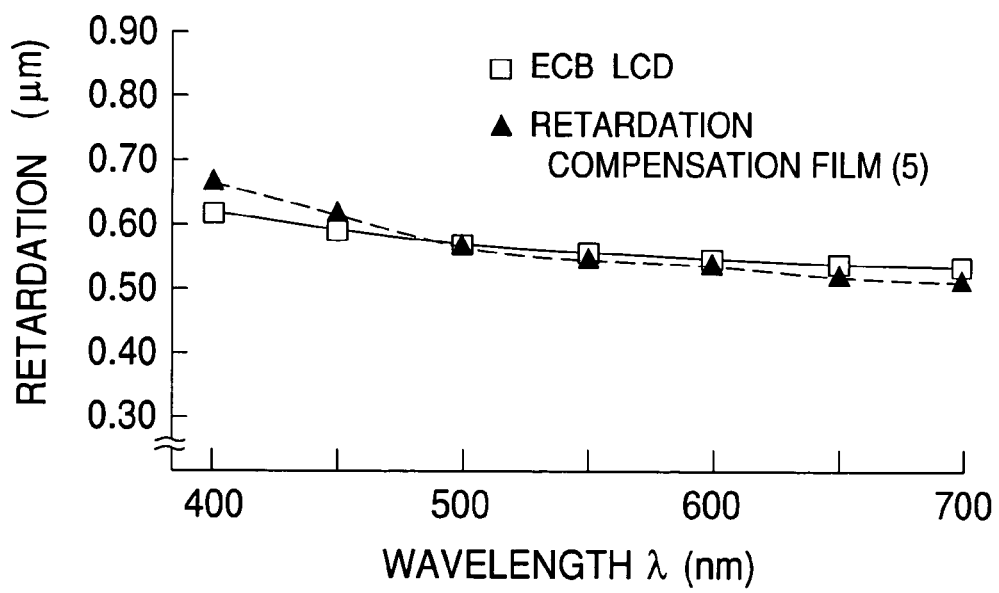
FIG. 17 is a table showing physical properties of a retardation compensation film (5)
FIG. 18 is a graph showing retardation characteristics of the retardation compensation film (5)

FIG. 17 shows the physical properties of the retardation compensation film (5) for the ECB liquid crystal device. The retardation compensation film (5) is composed of 56 LiNbO$_3$ film layers and 56 SiO$_2$ film layers that are alternately layered on a substrate. The LiNbO$_3$ film layer is used as the high refractive index layer, whereas The SiO$_2$ film layer is used as the low refractive index layer. The thicknesses of the LiNbO$_3$ film layer and the SiO$_2$ film layer are 27.5 nm and 22.5 nm, respectively (k=0.55). The total thickness d of the retardation compensation film is 2.8 μm. Referring to FIG. 18 that shows the graph of the wavelength dependence, the retardation (▲) of the retardation compensation film (4) is almost the same as the effective retardation (□) in the long wavelength side. Moreover, it is found that the characteristics of the phase compensation film (2) have improved in the short wavelength side. The difference in the retardation in the short and long wavelength side is so small that the residual retardation is not material for practical use.

Embodiments 6, 7

Figures 19, 20:
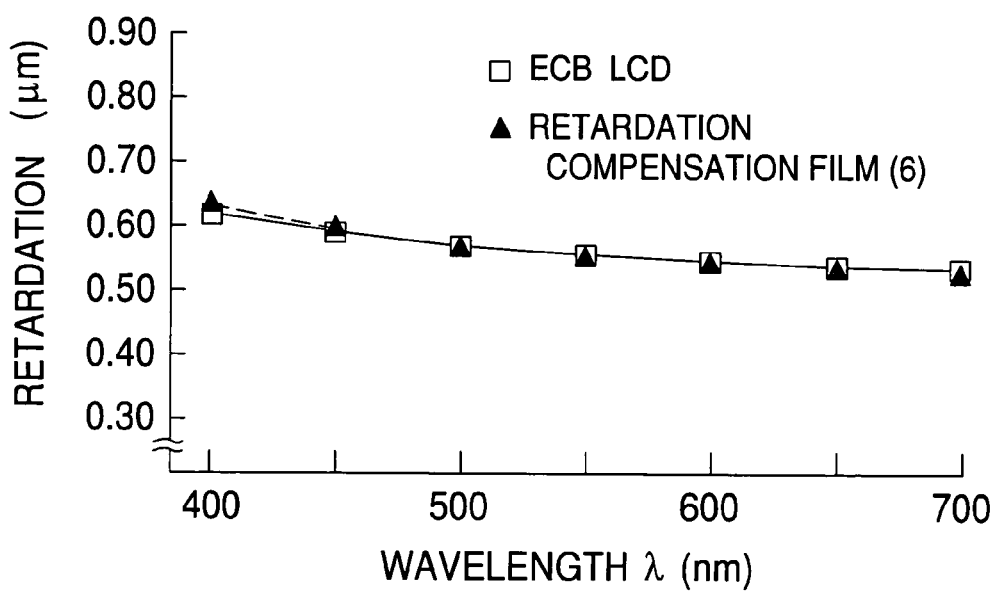
FIG. 19 is a table showing physical properties of a retardation compensation film (6)
FIG. 20 is a graph showing retardation characteristics of the retardation compensation film (6)
Figures 21, 22:
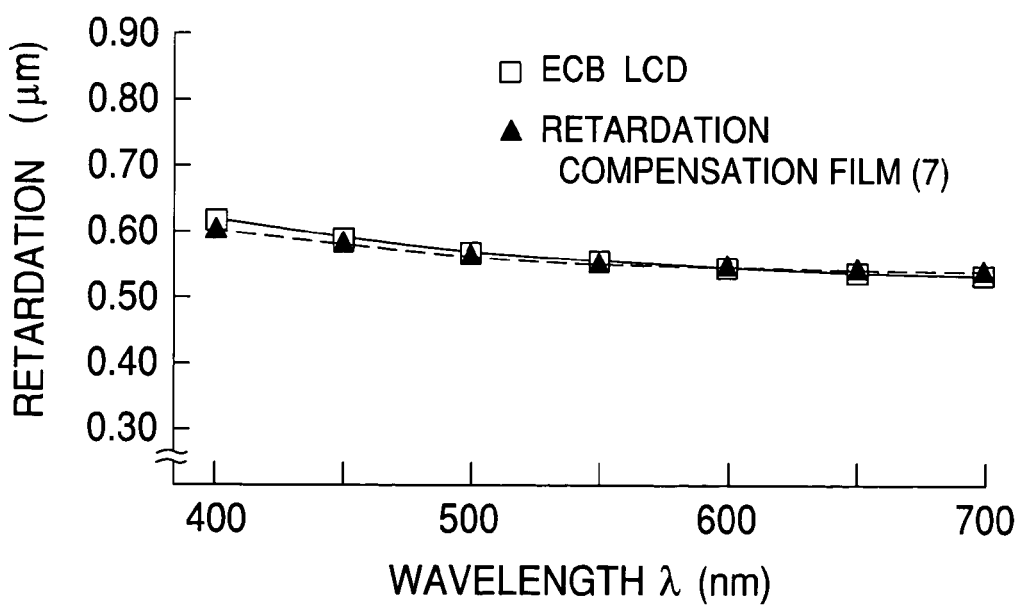
FIG. 21 is a table showing physical properties of a retardation compensation film (7)
FIG. 22 is a graph showing retardation characteristics of the retardation compensation film (7)

FIGS. 19, 21 show the physical properties of the retardation compensation films (6), (7) for the ECB liquid crystal device. The wavelength dependencies of the retardation compensation films (6), (7) are shown in FIGS. 20, 22, respectively. The retardation compensation film (6) is composed of 145 Y$_2$O$_3$ film layers as the high refractive index layer and 145 SiO$_2$ film layers as the low refractive index layer. The thicknesses of the Y$_2$O$_3$ film layer and the SiO$_2$ film layer are 33 nm and 27 nm, respectively (k=0.55). The total thickness d of the retardation compensation film (6) is 8.7 μm. The retardation compensation film (7) is composed of 266 Y$_2$O$_3$ film layers as the high refractive index layer and 266 MgF$_2$ film layers as the low refractive index layer. The thicknesses of the Y$_2$O$_3$ film layer and the MgF$_2$ film layer are 27.5 nm and 22.5 nm, respectively (k=0.55). The total thickness d of the retardation compensation film (7) is 13.3 μm. Referring to the graphs in FIGS. 20, 22, the retardation compensation films (6), (7) exhibit similar retardation characteristics as the ECB liquid crystal device, and therefore, can compensate the retardation sufficiently.

Although the retardation compensation films (6), (7) have excellent performance in compensating the retardation, large thickness d is required to obtain the desired retardation d·Δn because of small birefringence value Δn. In order to keep the thickness of each layer within the range from λ/100 to λ/5 of the wavelength of the incident light, it is necessary to increase the number of the thin film layers, and thus, not advantageous in productivity.

Figure 23:
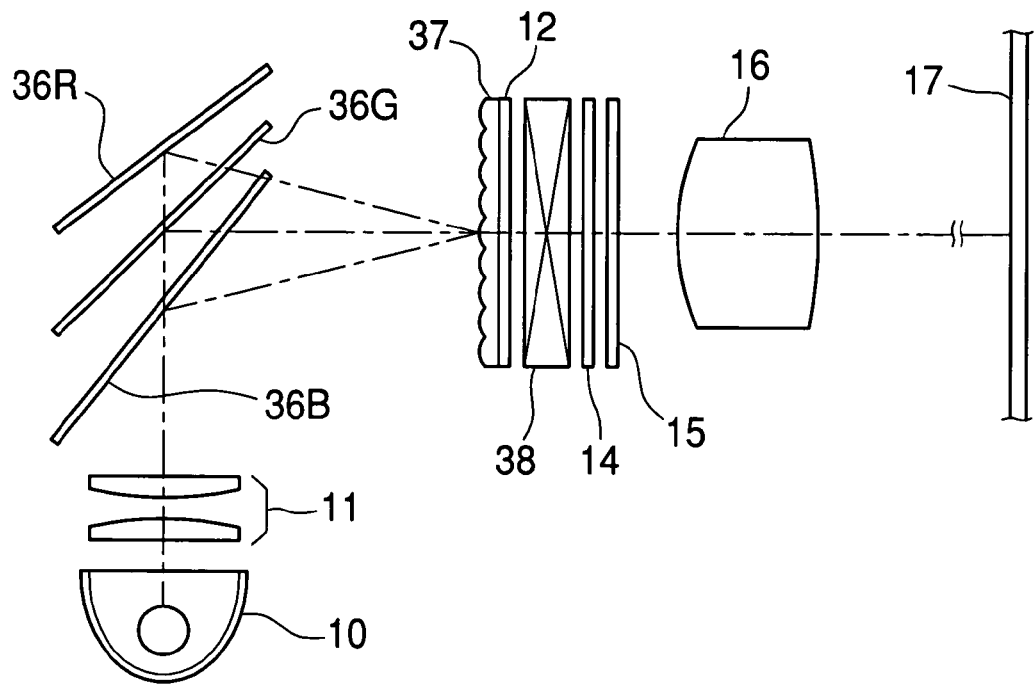
FIG. 23 is a block diagram showing an optical system of the single-plate type liquid crystal projector according to another embodiment.

The retardation compensation films according to the present invention, including the retardation compensation films (1)-(7) above, are applicable to the single-plate type liquid crystal projector shown in FIG. 23. In the liquid crystal projection of FIG. 23, the white light from the light source 10 is collimated by the condensing optical system 11, and then enters three dichroic mirrors 36B, 36G, 36R that are inclined at different angles. The red and green lights pass the dichroic mirror 36B, but the blue light is reflected on the dichroic mirror 36B. The green light is reflected on the dichroic mirror 36G, and the red light passes the dichroic mirror 36R.

A micro lens array 37 is provided in the incident side of the liquid crystal device 38, and the first polarizing plate 12 is provided on the rear surface of the micro lens array 37. The micro lens array 37 comprises plural microscopic convex lenses, arranged in matrix, to converge the primary color light from the dichroic mirrors 36B, 36G, 36R to the corresponding pixel of the liquid crystal device 38. Each pixel of the liquid crystal device 38 modulates the intensity of the corresponding color light based on the pixel image data. The modulated color lights from the liquid crystal device 38 is combined in the projection lens system 16 to form full-color image light, which is projected onto the screen 17. The first and second polarizing plates 12, 15 and the retardation compensator 14 are the same as those in FIG. 6.

Figure 24:
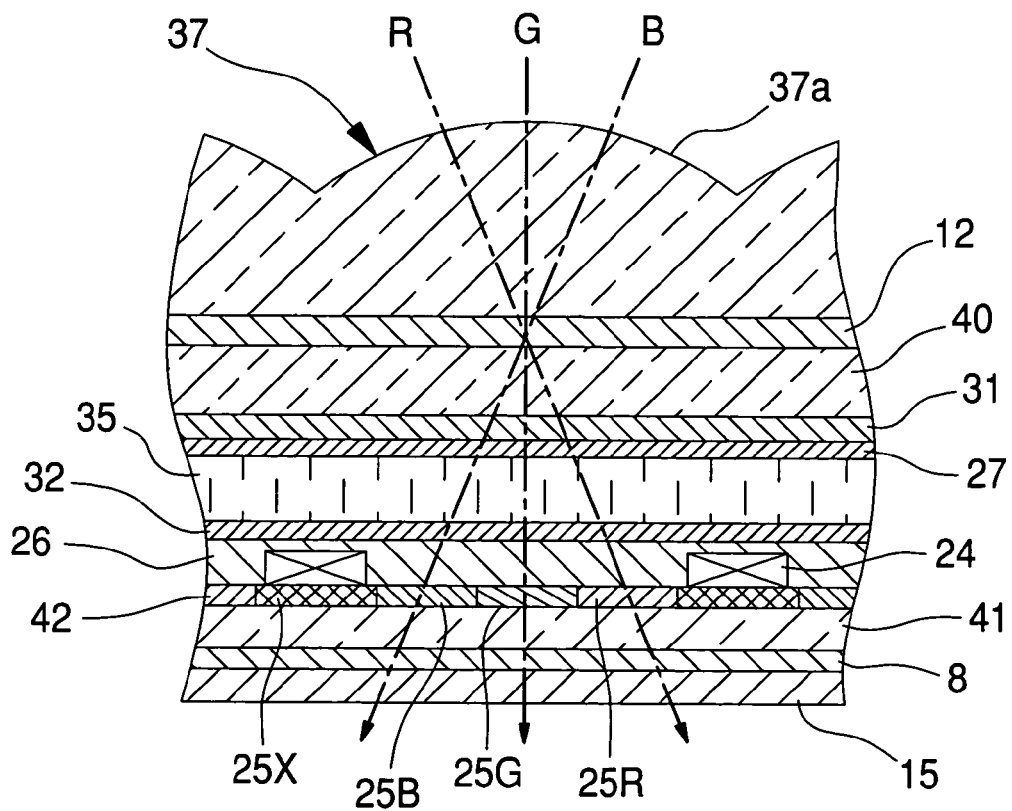
FIG. 24 is a partial cross section of the transmissive color liquid crystal device according to another embodiment.

Referring to FIG. 24, the micro lens array 37, the liquid crystal device 38, the retardation compensation film 8 and the second polarizing plate 15 are integrated to form the liquid crystal panel. The micro lens array 37 with the first polarizing plate 12 is piled on the incident surface of a first glass substrate 40. The common electrode 31 and the orientation film 27 are provided in the emanation side of the first glass substrate 40. An electrode layer 42, provided in the incident surface of a second glass substrate 41, has transparent active electrodes 25B, 25G, 25R and opaque black stripes 25X. The active electrodes 25B, 25G, 25R are arranged in matrix to constitute the pixel electrodes. Plural opaque electrodes 24 are provided on the black stripes 25X. The orientation film 32 is layered on the flat surface of the overcoat film 26 that covers the opaque electrodes 24 and the active electrodes 25B, 25G, 25R.

Three primary color lights enter the micro lens 37a of the micro lens array 37 at different incident angles, and focused to the corresponding color pixels of the liquid crystal layer 35. The transmissive densities of the corresponding color pixels are controlled by the applied voltage to the active electrodes 25B, 25G, 25R, so the primary color lights are modulated based on the density of the pixel image. The emanated color lights from the liquid crystal layer 35 enters the second polarizing plate 15 through the retardation compensation film 8 that compensates the phase retardation of the primary color lights.

Figure 25:
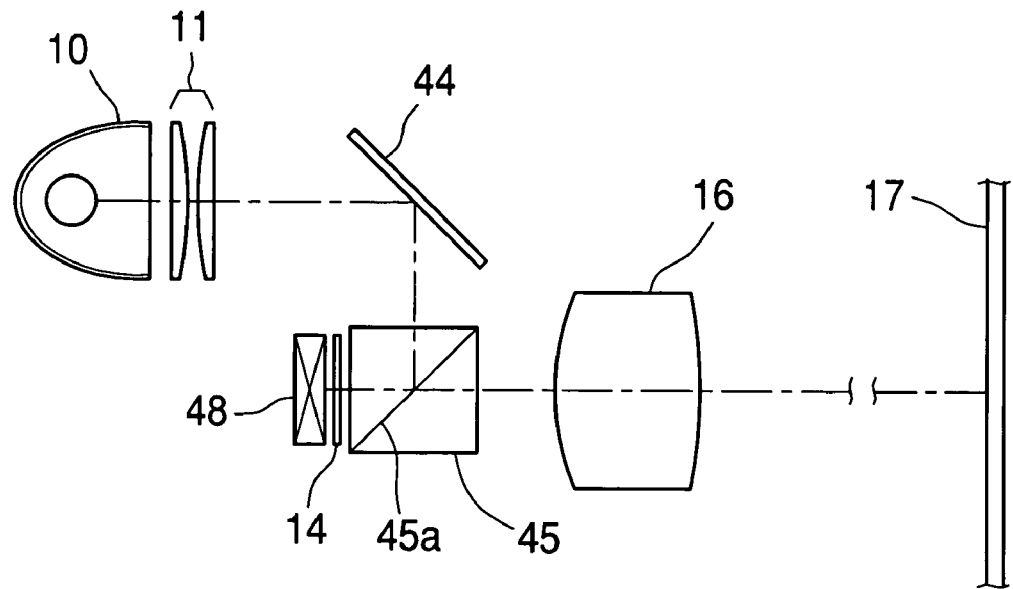
FIG. 25 is a block diagram showing an optical system of the single-plate type liquid crystal projector according to further embodiment.

The retardation compensator according to the present invention is also applicable to the single-plate type color liquid crystal projector having a transmissive liquid crystal device. As shown in FIG. 25, the white light from the light source 10 is collimated by the condensing optical system 11, and then reflected on a mirror 44 toward a polarizing beam splitter 45 having a polarizing film 45a. The polarizing film 45a changes s-polarized component of the white light into linearly polarized light, which is reflected towards the reflective liquid crystal device 48 through the retardation compensator 14.

Figure 26:
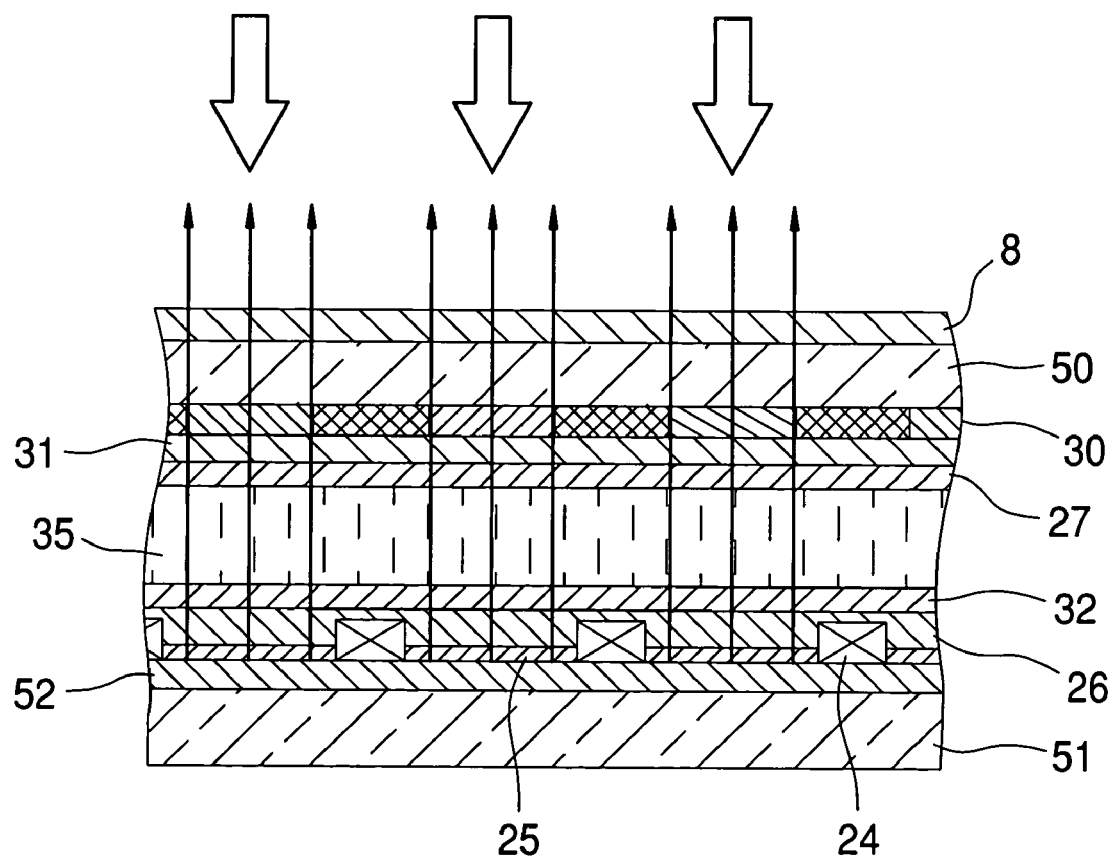
FIG. 26 is a partial cross section of the reflective color liquid crystal device.

Referring to FIG. 26, the reflective liquid crystal device 48 has the retardation compensation film 8 as the retardation compensator 14 on the front surface of a glass substrate 50. On the rear surface of the glass substrate 50, there is the micro color filter 30 in which blue, green red micro color filters are arranged in matrix to constitute the pixels. The common electrode 31 is formed on the rear side of the micro color filter 30, and the orientation film 27 covers the common electrode 31.

A reflective layer 52 is formed on a second glass substrate 51 by aluminum deposition, for instance. On the reflective layer 52, there are opaque electrodes 24, transparent active electrodes 25, the overcoat film 26 and the orientation film 32 in this order listed. The TN liquid crystal layer 35 is provided between the pair of orientation films 27, 32. The liquid crystal layer 35 modulates the transmissive density of the incident color light in accordance with the applied voltage to the active electrodes 25.

The linearly polarized white light from the beam splitter 45 enters the retardation compensation film 8, and then changed into three primary color lights by the micro color filters 30. The color lights enter the liquid crystal layer 35 in which transmissive densities of the pixels are controlled in accordance with the applied voltage to the active electrodes 25. Thereby, the incident color lights are converted into image lights.

The image light is reflected on the reflective layer 52, and then enters the liquid crystal layer 35, the color micro filter 30 and the retardation compensation film 8 in this order listed. Since the image light passes the liquid crystal layer 35 twice, the phase retardation between the ordinary component and the extraordinary component becomes twice. Since the image light passes the retardation compensation film 8 twice as well, the retardation d·Δn is decided on the basis of the actual thickness of the liquid crystal layer 35. Note that it is necessary to consider the coefficient α if the liquid crystal layer 35 has TN liquid crystal molecules.

The emanated image light from the retardation compensation film 8 is changed into the p-polarized light to the polarizing film 45a. Thus, the image light can pass the polarizing film 45a, and then projected onto the screen as a full color image through the projection lens system 16. The applied voltage to the active electrodes 25 and the transmittance of the micro color filters 30 are adjusted in consideration of the fact that the incident light passes the liquid crystal layer 35 and the micro color filters 30 twice.

Referring to FIGS. 27 to 35, the embodiments of the retardation compensation film 8, preferably applied to the transmissive color liquid crystal device shown in FIG. 26, will be explained. The liquid crystal device 48 has TN liquid crystal molecules, and the thickness d of the liquid crystal layer 35 is 2.0 μm. As shown in FIG. 27 to show the physical properties of the TN liquid crystal device, the birefringence values Δn is the same as the TN liquid crystal device shown in FIG. 7. Thus, it is possible to adjust the retardation d·Δn and the effective retardation Re by changing the thickness d of the liquid crystal layer 35.

Embodiment 8

Figures 29, 30:
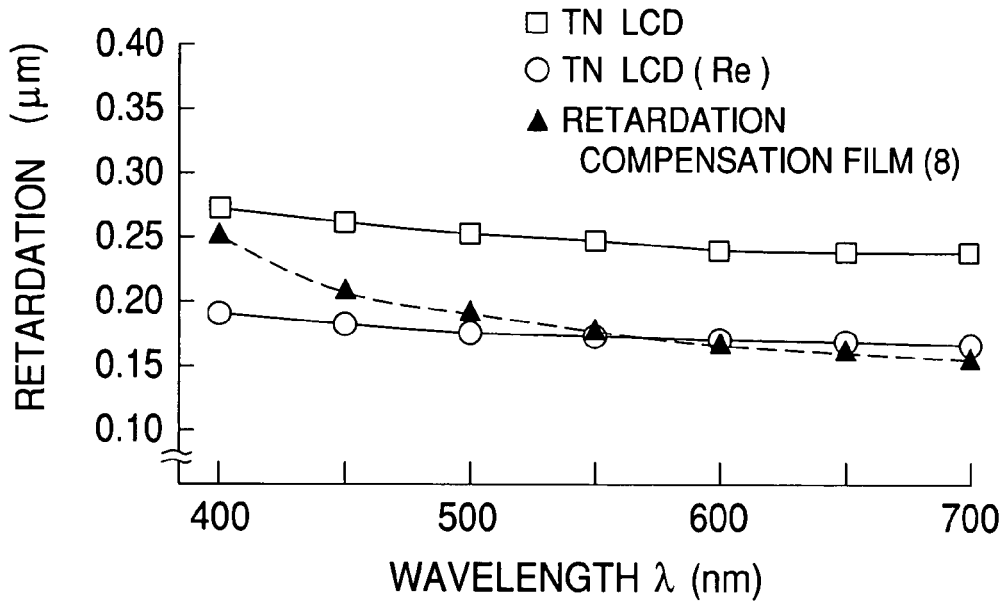
FIG. 29 is a graph showing retardation characteristics of the retardation compensation film (8)
FIG. 30 is a table showing physical properties of a retardation compensation film (9)

FIG. 28 shows the physical properties of the retardation compensation film (8) for the transmissive liquid crystal device. The retardation compensation film (8) is composed of 18 TiO$_2$ film layers and 18 SiO$_2$ film layers that are alternately layered on a substrate. The TiO$_2$ film layer is used as the high refractive index layer, whereas The SiO$_2$ film layer is used as the low refractive index layer. The thicknesses of the TiO$_2$ film layer and the SiO$_2$ film layer are 27.5 nm and 22.5 nm, respectively (k=0.55). The total thickness d of the retardation compensation film (8) is 0.9 μm. Referring to FIG. 29 that shows the graph of the wavelength dependence, the retardation (▲) of the retardation compensation film (8) agrees with the effective retardation (○) of TN liquid crystal device at the wavelength approximately the center of the visible band. As the retardation compensation film (1) above, the retardation compensation film (8) can compensate the phase retardation enough for practical use, although over compensation in the short wavelength side.

Embodiment 9

FIG. 30 shows the physical properties of the retardation compensation film (9) for the transmissive liquid crystal device. The retardation compensation film (9) is composed of 28 LiNbO$_3$ film layers and 28 SiO$_2$ film layers that are alternately layered on a substrate. The LiNbO$_3$ film layer is used as the high refractive index layer, whereas The SiO$_2$ film layer is used as the low refractive index layer. The thicknesses of the LiNbO$_3$ film layer and the SiO$_2$ film layer are 22.0 nm and 18.0 nm, respectively (k=0.55). The total thickness d of the retardation compensation film (9) is 1.12 μm. Referring to FIG. 30 that shows the graph of the wavelength dependence, the retardation (▲) of the retardation compensation film (9) agrees with the effective retardation (○) of TN liquid crystal device at the wavelength about 500 nm. With the retardation compensation film (9), it is possible to compensate the phase retardation sufficiently over the visible band.

Embodiment 10

Figures 31, 32:
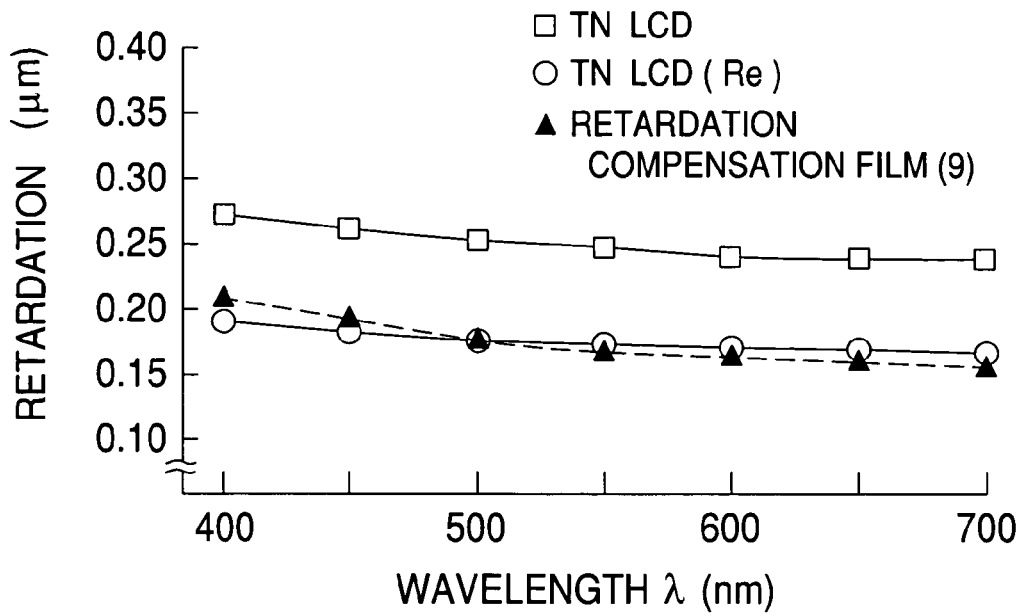
FIG. 31 is a graph showing retardation characteristics of the retardation compensation film (9)
FIG. 32 is a table showing physical properties of a retardation compensation film (10)
Figures 33, 34:
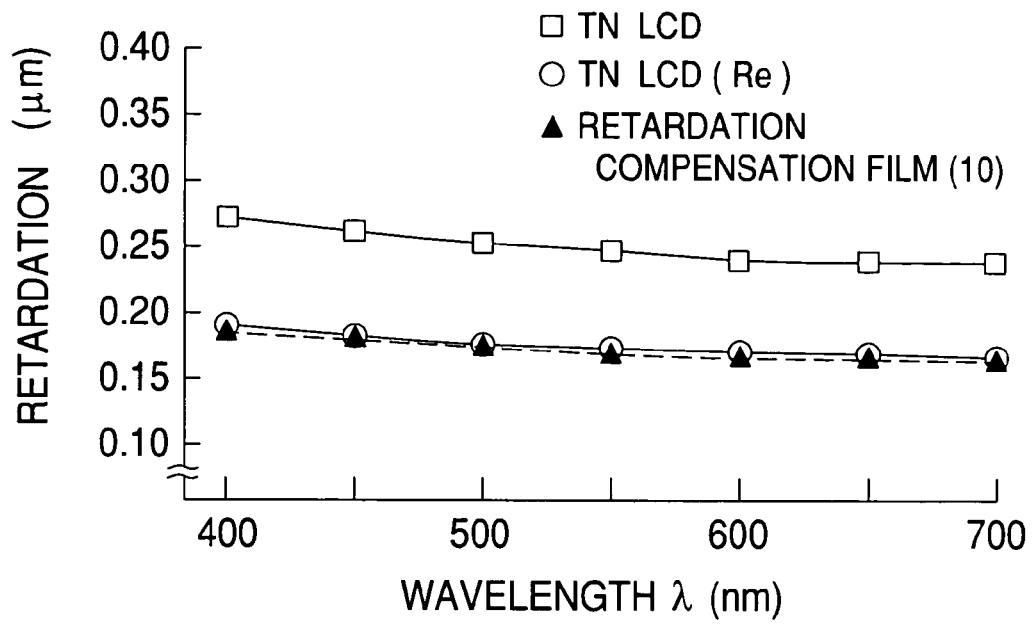
FIG. 33 is a graph showing retardation characteristics of the retardation compensation film (10)
FIG. 34 is a table showing physical properties of a retardation compensation film (11)
Figure 35:
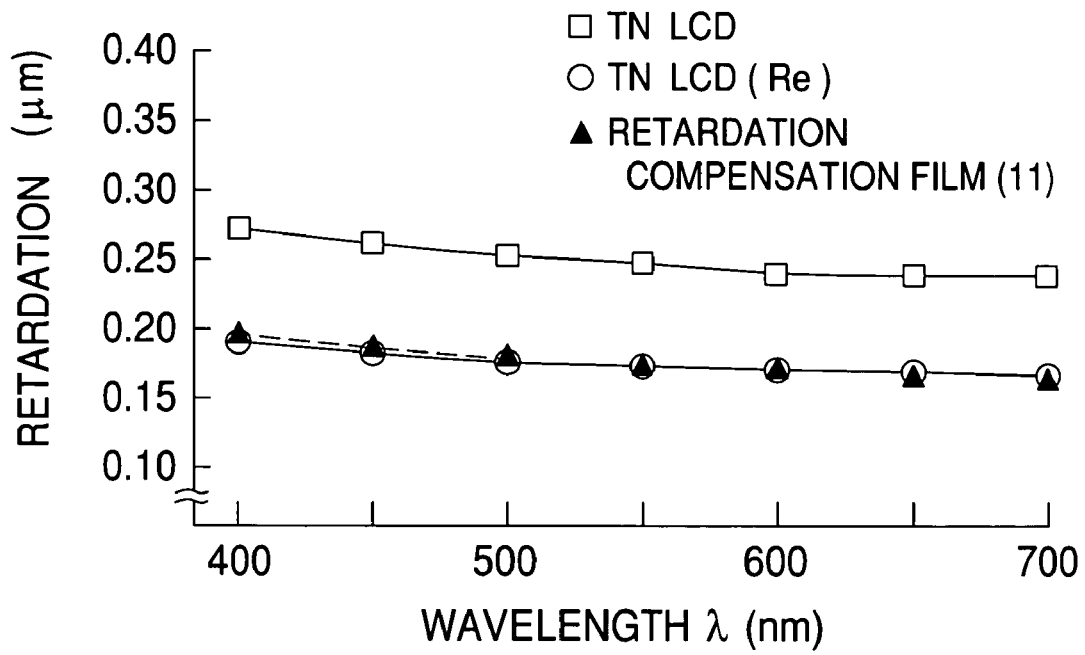
FIG. 35 is a graph showing retardation characteristics of the retardation compensation film (11)

FIG. 32 shows the physical properties of the retardation compensation film (10) for the transmissive liquid crystal device. The retardation compensation film (10) is composed of 82 MgO film layers and 82 MgF$_2$ film layers that are alternately layered on a substrate. The MgO film layer is used as the high refractive index layer, whereas The MgF$_2$ film layer is used as the low refractive index layer. The thicknesses of the MgO film layer and the MgF$_2$ film layer are 27.5 nm and 22.5 nm, respectively (k=0.55). The total thickness d of the retardation compensation film (10) is 4.1 μm. Referring to FIG. 33 that shows the graph of the wavelength dependence, the retardation (▲) of the retardation compensation film (10) is approximately the same as the effective retardation (○) of TN liquid crystal device over the visible band.

Embodiment 11

FIG. 34 shows the physical properties of the retardation compensation film (11) for the transmissive liquid crystal device. The retardation compensation film (11) is composed of 37 Y$_2$O$_3$ film layers and 37 MgF$_2$ film layers that are alternately layered on a substrate. The Y$_2$O$_3$ film layer is used as the high refractive index layer, whereas The MgF$_2$ film layer is used as the low refractive index layer. The thicknesses of the Y$_2$O$_3$ film layer and the MgF$_2$ film layer are 27.5 nm and 22.5 nm, respectively (k=0.55). The total thickness d of the retardation compensation film (11) is 1.85 μm. Referring to FIG. 34 that shows the graph of the wavelength dependence, the retardation (▲) of the retardation compensation film (11) is approximately the same as the effective retardation (○) of TN liquid crystal device over the visible band.

The retardation compensator according to the present invention is also applicable to the transmissive liquid crystal device that is located at an off-axis position (the position where the incidence optical axis and the emanation optical axis are different). The retardation compensation films or the polarizing plates may be provided in both incidence and emanation optical axes. In providing the retardation compensation films in both of incidence and emanation optical axes, the thicknesses of the retardation compensation films may be decided such that the total retardation thereof is double the retardation of the liquid crystal device.

As mentioned so far, the retardation compensation film having high and low refractive index layers L1, L2 is preferable as an inorganic retardation compensator with microscopic structure smaller than the wavelength of visible band. In consideration of the wavelength dependence of the retardation of the liquid crystal device, the birefringence value $\Delta n$ and the wavelength dependence by adjusting the thicknesses and the refractive indices of the thin film layers L1, L2. Then, the total thickness of the retardation compensation film is adjusted to make the difference in the retardation as small as possible over the visible band. Therefore, it is possible to design the retardation compensator easily in accordance with the type of the liquid crystal device and the projection optical system. Moreover, the retardation compensation film exhibits excellent performance to compensate the retardation of three primary color lights.

The high and low refractive index thin film layers L1, L2 are deposited by use of deposition equipment, such as vacuum deposition equipment or sputter deposition equipment. The deposition equipment has shutters to shield the substrate from the source materials. The shutters are alternatively open and close while heating the deposition source materials, so that the two kinds of thin film layers are alternately deposited on the substrate. Instead of the shutters, the substrate may be held on a holder that moves the substrate at a predetermined speed. The thin film layers are alternatively deposited by passing the substrate above the heated source materials. As for the materials for inorganic thin film layers, any known materials for deposition may be utilized. Examples of the materials for the inorganic thin films are $TiO_2$, $SiO_2$, $ZrO_2$, MgO, $CeO_2$, $SnO_2$, $Ta_2O_5$, $Y_2O_3$, $LiNbO_3$, $MgF_2$, $CaF_2$ and $Al_2O_3$.

The retardation compensation film described above is an example of a form birefringence as a negatively uniaxial c-plate. It is also possible to utilize an inorganic form birefringence shown in FIG. 36 as the retardation compensator to exhibit similar optical performance. The form birefringence 70 in FIG. 36 has plural transparent ridges 67 that are arranged substantially in parallel on the top surface 66a of the glass substrate 66. Each of the ridges 67, with the refractive index $n_A$, has a substantially rectangular parallelepiped shape.

The thickness d, the height h and the gap between adjacent two ridges 67 are sufficiently smaller than the wavelength $\lambda$ of incident light. For instance, the optical thickness (the product of the thickness d and the refractive index $n_A$) of the form birefringence 70 is preferably from $\lambda/100$ to $\lambda/5$, more preferably from $\lambda/50$ to $\lambda/5$, and practically from $\lambda/30$ to $\lambda/10$. The optical isotropic axis 70a with no optical anisotropy extends in the direction parallel to the top surface 66a of the glass substrate 66. The form birefringence layer 70 exhibits the optical characteristics as a-plate, and located such that the top surface 66a of the glass plate 66 is perpendicular to the illumination or projection axis. The arrangement of the ridges 67 causes the refractive index distribution by air (=1) and the ridge 67 (=$n_A$) along the direction parallel to the optical isotropic axis 70a.

The birefringence $\Delta n$ of the form birefringence 70 depends on the thickness S of the ridge 67 and the interval between adjacent ridges 67. The retardation of the form birefringence 70 is defined as $h \cdot \Delta n$. Due to the wavelength dependence of the refractive index $n_A$ of the ridge 67, the birefringence value $\Delta n$ has wavelength dependence as well. In order to adjust the retardation, the height h of the ridge 67 may be changed such that the difference in retardation between the liquid crystal device and the form birefringence becomes as small as possible over the visible band.

Figure 37:
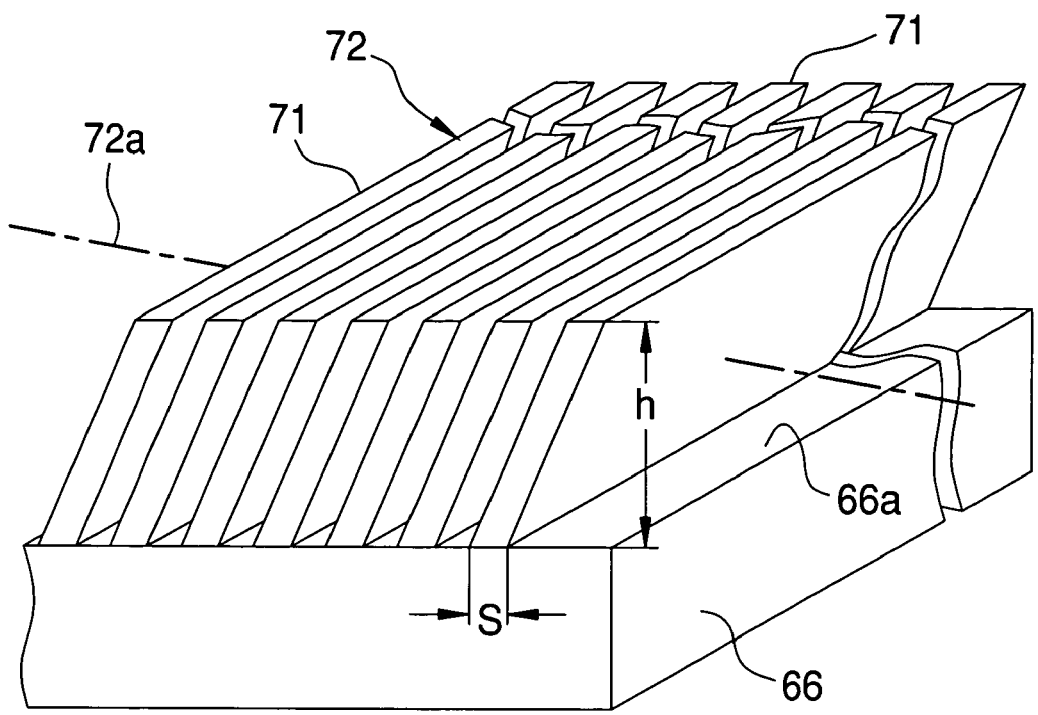

The ridges on the glass substrate may not necessarily be perpendicular to the glass substrate. FIG. 37 shows an example of a form birefringence 72 with plural transparent ridges 71 that are inclined to the top surface 66a of the glass substrate 66. The optical isotropic axis 72a extends in the direction oblique to the top surface 66a of the glass substrate 66. The form birefringence 72 is located such that the top surface 66a of the glass plate 66 is perpendicular to the illumination or projection axis. Thus, the form birefringence 72 exhibits optical characteristics of a negatively uniaxial birefringent o-plate with its optical isotropic axis oblique to the top surface 66a of the glass substrate 66. In the same manner as the form birefringence 70 in FIG. 21, it is possible to adjust the retardation of the form birefringence 72 in the visible band by changing the height h of the ridge 71.

Figure 36:
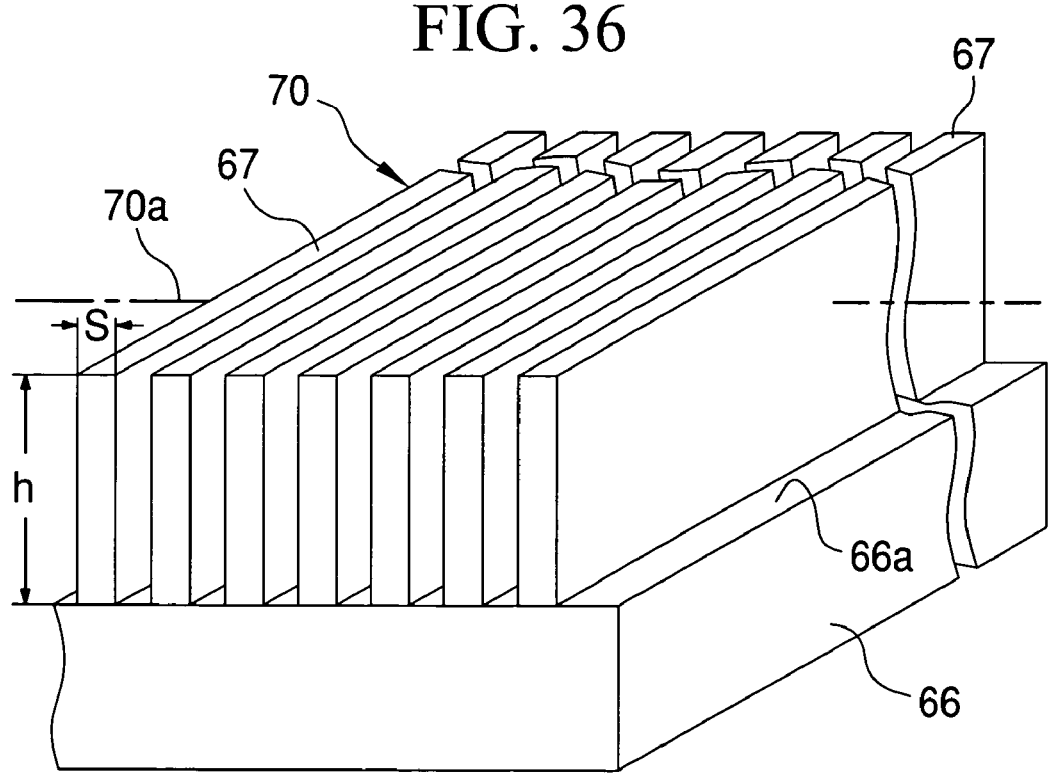
FIGS. 36, 37, 38, 39, 40 and 41 are schematic views of examples of form birefringence applicable to a retardation compensator.

The ridges 67, 71 shown in FIGS. 36, 37 are formed by photo lithography and etching processes. Note that the aspect ratio of the height h of the ridge 67, 71 to the width d thereof needs to be sufficiently large in order to obtain the negatively uniaxial birefringent effect. If the aspect ratio is not large enough, the form birefringence 70, 72 becomes a biaxial birefringence body in which the refractive indices ($n_x$, $n_y$, $n_z$) in the refractive index ellipsoid are completely different.

Figure 38:
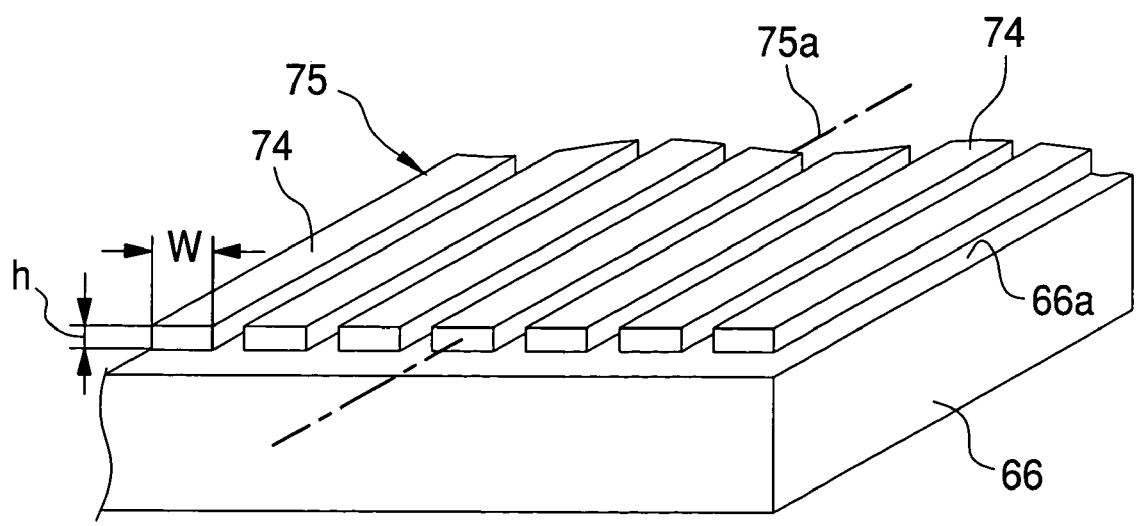

When the aspect ratio of the ridges is extremely small, the form birefringence becomes a positively birefringent a-plate, the optical isotropic axis of which extends in the plane parallel to the substrate. Thus, the positively birefringent a-plate is a retardation plate in which the retardation to polarized light passing through the form birefringence in the direction perpendicular to the substrate is different depending upon the polarized direction. The a-plate changes linearly polarized light, with the incident angle of 45 degrees, into circularly polarized light when the retardation $d \cdot \Delta n$ is one-fourth of the wavelength. Such a-plate is utilized as a quarter wave plate in combination of a reflective liquid crystal device. As shown in FIG. 38, an example of the form birefringence 75 as the positively birefringence a-plate has transparent dielectric ridges 74 arranged in line at certain intervals on the glass substrate 66.

The width W, height h and the interval of the ridges 74 are much smaller than the wavelength of incident light.

The optical isotropic axis 75a extends in the direction parallel to the ridges 74. The arrangement of the ridges 74 causes one-dimensional refractive index distribution by air and the ridge in the plane perpendicular to the illumination or projection axis. The form birefringence 75 is located such that the top surface 66a of the glass plate 66 is perpendicular to the illumination or projection axis. The retardation of the form birefringence 75 is defined as the product of the height h and the birefringence value $\Delta n$ that depends on the structure and the refractive index of the ridge 74. Thus, it is possible to adjust the retardation by changing the height h in accordance with the primary color of incident light. When the height h of the ridge 74 becomes larger than the wavelength of incident light, the form birefringence 75 becomes a biaxial birefringence body. If the height of the ridge 74 becomes much larger than the wavelength, the form birefringence 75 exhibits optical characteristics of a negatively birefringent c-plate. Note that the gap between two ridges 74 may be filled with a dielectric material with different refractive index from the ridge 74.

Figure 39:
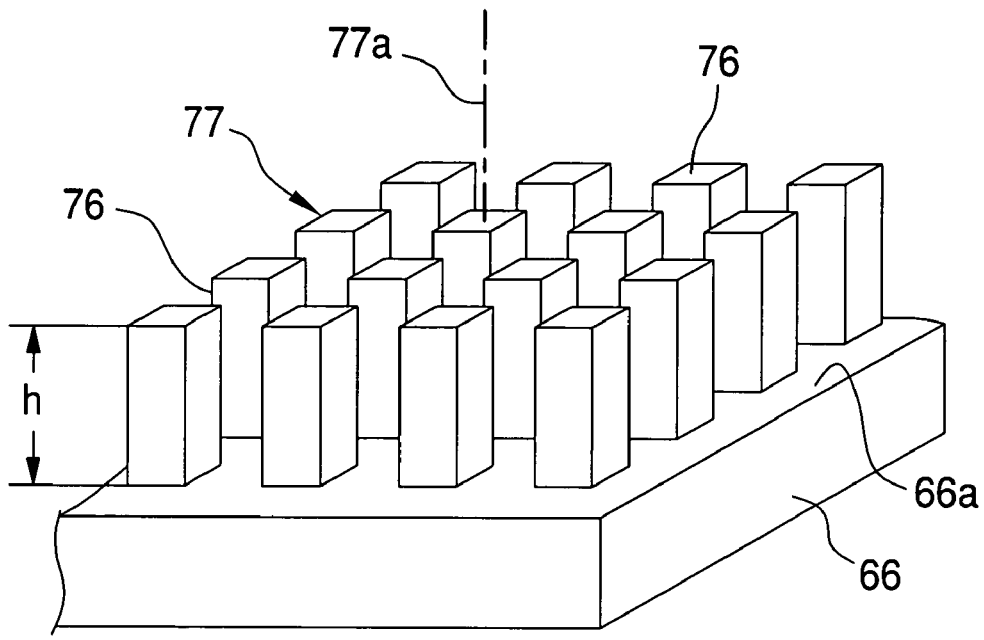
Figure 40:
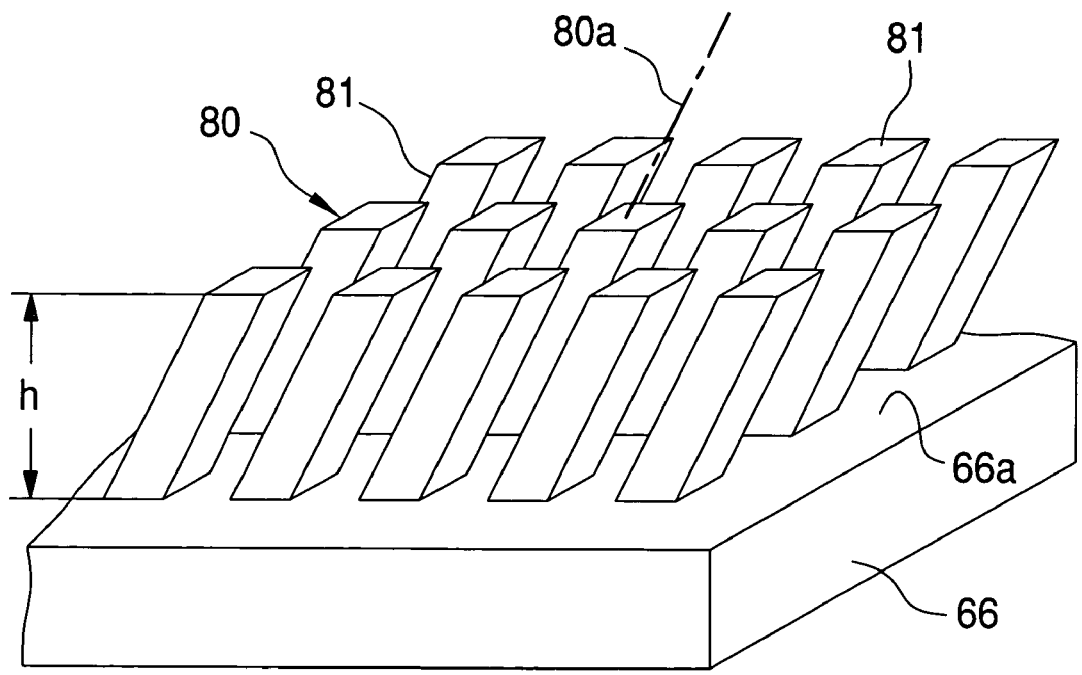
Figure 41:
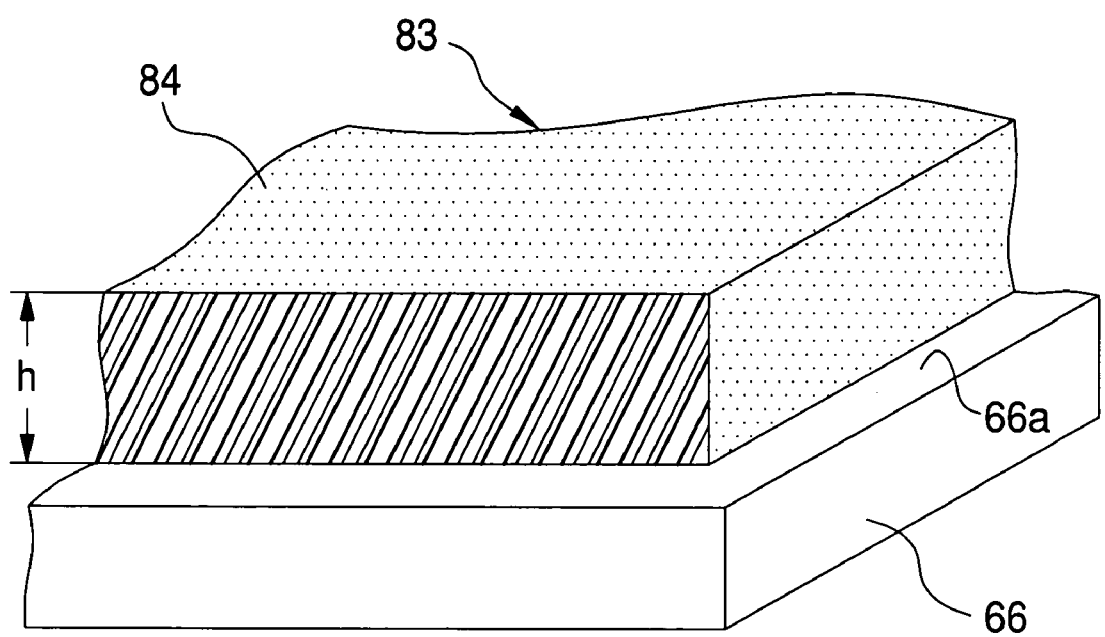

FIGS. 39, 40 and 41 illustrate examples of the positive form birefringence. In FIG. 39, the form birefringence 77 has transparent dielectric pillars 76 arranged at certain intervals on the glass substrate 66. Each dielectric pillar 76 has a substantially rectangular parallelepiped shape. The size and the intervals of the dielectric pillars 76 are much smaller than the wavelength of incident light, so the form birefringence 77 exhibits a positive c-plate in terms of crystal optics. The form birefringence 77 is located such that the top surface 66a of the glass plate 66 is perpendicular to the illumination or projection axis. The optical isotropy axis 77a is perpendicular to the top surface 66a of the glass substrate 66. The arrangement of the pillars 76 causes two-dimensional refractive index distribution by air and the pillar in the plane perpendicular to the illumination or projection axis. The pillars 76 are formed by photo lithography and etching processes. It is possible to adjust the retardation in the visible band by changing the height h of the ridges 76.

FIG. 40 shows another embodiment of the positively birefringent o-plate as the form birefringence 80 with transparent dielectric pillars 81 regularly arranged on the glass substrate 66. The dielectric pillars 81 are inclined to the glass substrate 66 at a predetermined angle. The size and the intervals of the dielectric pillars 81 are much smaller than the wavelength of incident light. The gap between the pillars 81 may be filled with air or a dielectric material with different refractive index from the pillar 81. The optical axis 80a of the form birefringence 80 is oblique to the top surface 66a of the glass substrate 66. The pillars 81 may be formed by photo lithography and etching processes. It is possible to adjust the retardation in the visible band by changing the height h of the pillars 81.

A dielectric layer 84 as the positively birefringent o-plate may be formed by oblique deposition of one kind of dielectric material on the glass substrate 66 (see FIG. 41), as described in U.S. Pat. No. 5,638,197. By use of the oblique deposition, it is possible to obtain the structure much smaller than the wavelength of incident light. Note that the oblique lines in FIG. 26 do not depict the borders between adjacent dielectric layers 84. The form birefringence 83 is located so that the top surface 66a of the glass plate 66 is perpendicular to the illumination or projection axis. Accordingly, the oblique thin film layers 84 exhibit positively birefringent o-plate. It is possible to adjust the retardation over the visible band by changing the height h of the dielectric layer 84.

For the purpose of compensating the retardation of incident light caused by the liquid crystal device, plural form birefringences may be combined. For instance, the combination of negative and positive form birefringences makes it possible to compensate the retardation more effectively so that the image contrast ratio on the screen may improve. The retardation compensator is applicable to the liquid crystal devices of other type than transmissive TN and ECB type. Examples of the liquid crystal devices are reflective VA (Vertical Aligned) type, OCB (Optically Compensated Birefringence) type and FLC (Ferro electric Liquid Crystal) type. The present invention is also applicable to the liquid crystal projector, such as the off-axis type and the micro lens type, in which incident light obliquely enters the liquid crystal device.

In forming the retardation compensation film from thin films by deposition or sputtering, the substrate may be fixed to the optical part such as the lens element of illumination or projection lens system and the glass substrate of the liquid crystal device. Forming the retardation compensation film on such optical part is effective in reducing the number of the optical parts and the alignment procedure to adjust the position and angle of the optical parts.

The retardation compensation film may be attached on either the inner surface or the outer surface of the substrate of the liquid crystal device. The retardation compensation film is preferably attached on the inner surface for the purpose of reducing interfacial reflection between air and the retardation compensator. Such arrangement can effectively decrease light leakage or deterioration in image quality. The retardation compensation film may be attached to either the active side substrate with pixel electrodes to apply the voltage, or the opposite side substrate with the common electrode. The anti-reflection coating is preferably on either or both sides of the retardation compensation film, if necessary. Interferential thin films as the anti-reflection coating are easily formed during the some batch of process to deposit thin film layers for the retardation compensation film.

The thickness ratio of two different thin films for the retardation compensation film is not limited to 11:9 (k=0.55), but may be other ratio such as 1:1. The retardation compensation film in the liquid crystal projector is not limited to the one with two kinds of thin films alternatively deposited on the substrate. For instance, more than two kinds of thin films with different refractive indices may be deposited. The thickness and the deposition order may be determined in consideration of fabrication facility, internal stress in each layer, wavelength dependency of the refractive index of the thin film, and so forth. It is possible to combine the form birefringence described above with a retardation compensation sheet that has a polymer film with durability as the substrate.

Various changes and modifications are possible in the present invention and may be understood to be within the present invention.

What is claimed is:

1. A retardation compensator for compensating the phase retardation caused by birefringence of incident light to a liquid crystal layer of a liquid crystal device for a signal-plate type liquid crystal projector, the retardation compensator being located at a position to cover at least one of the incident surface and the emanation surface of the liquid crystal device, the retardation compensator comprising:

a form birefringence in which the absolute value of the retardation, defined as the product of the birefringence and the thickness in the optical axis direction, is approximately the same as the absolute value of the retardation of the liquid crystal layer in operation at least at one wavelength in the visible band, wherein the form birefringence is a retardation compensation film comprising at least two kinds of thin film layers with different refractive indices that are alternately layered, and the optical thickness of each thin film layer is $1/100$ to $1/5$ of the standard wavelength of blue light.

2. The retardation compensator according to claim 1, wherein the retardation compensation film is composed of one kind of high refractive index layer and one kind of low refractive index layer.

3. The retardation compensator according to claim 1, wherein the retardation compensator is a plurality of birefringent members arranged to appear one or two dimensional refractive index distribution in the plane perpendicular to the optical axis of the incident light; and wherein the optical thickness of each thin film layer, defined as the product of the refractive index and the thickness in the optical axis direction, is $1/100$ to $1/5$ of the standard wavelength of blue light.

4. A single-plate type color liquid crystal projector that has a liquid crystal device to modulate the intensity of incident light to generate image light and projects the image light to a screen to display an image, the liquid crystal projector having a retardation compensator for compensating the phase retardation caused by birefringence of incident light to a liquid crystal layer, the retardation compensator being located at a position to cover at least one of the incident surface and the emanation surface of the liquid crystal device, the retardation compensator comprising:
- a form birefringence in which the absolute value of the retardation, defined as the product of the birefringence and the thickness in the optical axis direction, is approximately the same as the absolute value of the retardation of the liquid crystal layer at least at one wavelength in the visible bands, wherein the form birefringence is a retardation compensation film comprising at least two kinds of thin film layers with different refractive indices that are alternately layered, and the optical thickness of each thin film layer is $1/100$ to $1/5$ of the standard wavelength of blue light.

5. The liquid crystal projector according to claim 4, wherein the retardation compensation film is composed of one kind of high refractive index layer and one kind of low refractive index layer.

6. The liquid crystal projector according to claim 4, wherein the retardation compensator is a plurality of birefringent members arranged to appear one or two dimensional refractive index distribution in the plane perpendicular to the optical axis of the incident light; and
- wherein the optical thickness of each thin film layer, defined as the product of the refractive index and the thickness in the optical axis direction, is $1/100$ to $1/5$ of the standard wavelength of blue light.

7. The liquid crystal projector according to claim 4, further comprising at least one color filter.

8. The liquid crystal projector according to claim 7, wherein the at least one color filter comprises blue, green and red color filters.

* * * * *